(12) United States Patent
Machida

(10) Patent No.: US 6,714,974 B1
(45) Date of Patent: Mar. 30, 2004

(54) DATA PROCESSING APPARATUS AND DISPLAY PROCESSING METHOD

(75) Inventor: Haruo Machida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/544,163

(22) Filed: Apr. 6, 2000

(30) Foreign Application Priority Data

Apr. 9, 1999 (JP) .......................................... 11-102069

(51) Int. Cl.$^7$ ............................................ G06F 15/173
(52) U.S. Cl. ..................... 709/223; 709/204; 709/224; 345/735; 345/736; 345/753
(58) Field of Search .................................. 709/204–205, 709/223–224; 345/734–737, 753, 835, 853–855

(56) References Cited

U.S. PATENT DOCUMENTS

| | | | | |
|---|---|---|---|---|
| 5,261,044 A | * | 11/1993 | Dev et al. | 709/223 |
| 5,295,244 A | * | 3/1994 | Dev et al. | 709/223 |
| 5,500,934 A | * | 3/1996 | Austin et al. | 345/853 |
| 5,751,965 A | * | 5/1998 | Mayo et al. | 709/224 |
| 6,195,683 B1 | * | 2/2001 | Palmer et al. | 709/223 |
| 6,535,227 B1 | * | 3/2003 | Fox et al. | 709/223 |

OTHER PUBLICATIONS

US Patent Application, Ser. No. 09/544,265, Filing Date Apr. 6, 2000.

* cited by examiner

Primary Examiner—Bharat Barot
(74) Attorney, Agent, or Firm—Fitzpatrick, Cella, Harper & Scinto

(57) ABSTRACT

There is disclosed a data processing apparatus which uses a visual element to recognizably provide a system environment which flexibly and quickly changes in response to any request for the grasping of the constitution and operation situation of the entire system or the constitution and operation situation of a favorite device registered by each user.

76 Claims, 21 Drawing Sheets

REGISTER DELETE — 801

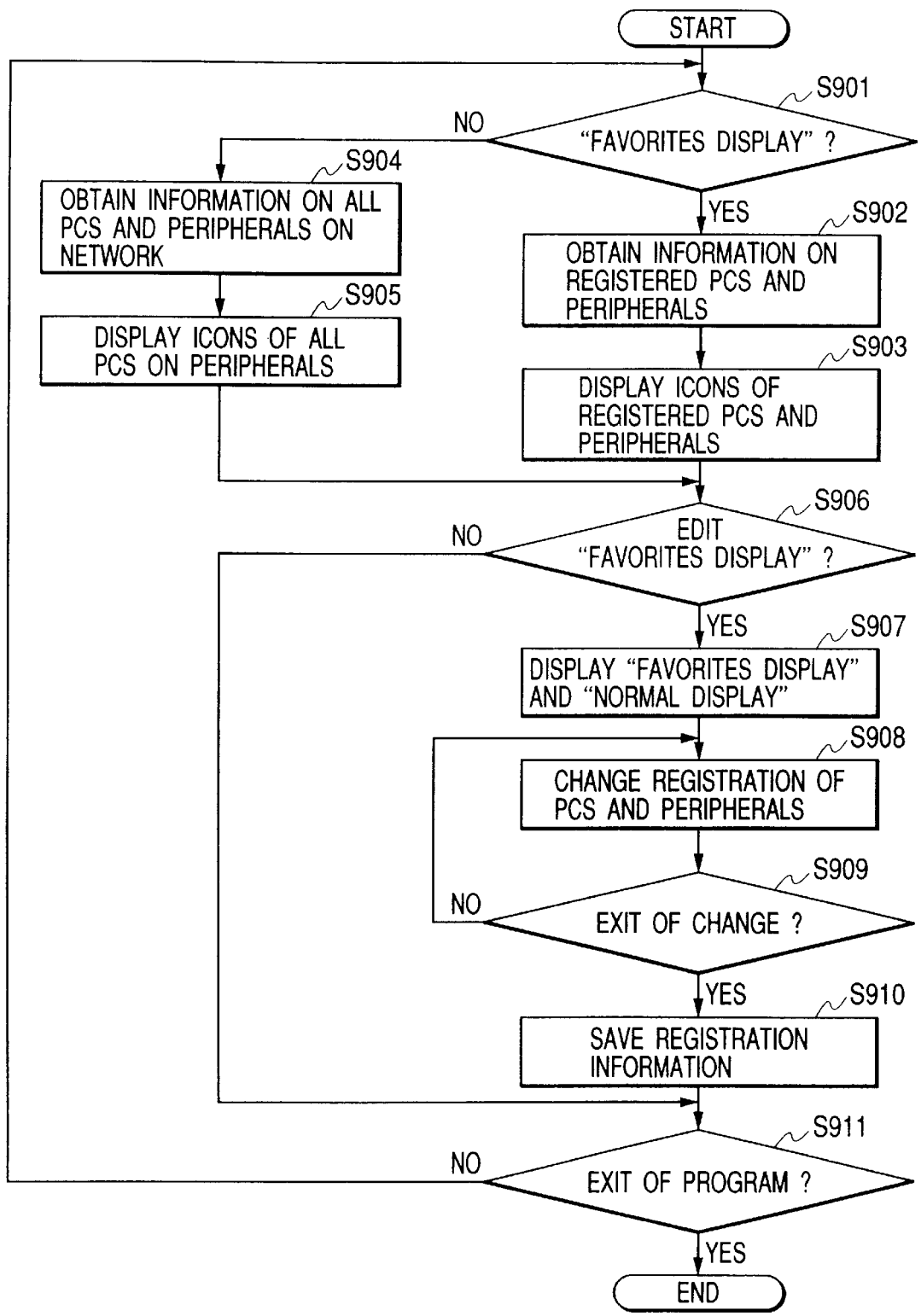

| SENDER SETUP |
|---|

SELECT SENDER COMPUTER AND PRESS "EXECUTE".
PRESS "CANCEL" FOR CANCELING JOB.

| NAME | COMMENT |
|---|---|
| ⚲ ENT_NET | ENTIRE NETWORK |
| 🖥 Libretto100 | H○○ M○○ |
| 🖥 Snpc00 | DEXX Opxxx GXxxx |
| 🖥 Snpc01 | |
| 🖥 Snpc02 | ○○ (GAXXXX1234) |
| 🖥 Snpc04 | F○○-5678 w○○○ |
| 🖥 Snpc05 | K○○ MACHINE |
| 🖥 Snpc06 | ○○○○ MACHINE |

EXECUTE    CANCEL

| SENDER SETUP |
|---|

SELECT SENDER COMPUTER AND PRESS "EXECUTE".
PRESS "CANCEL" FOR CANCELING JOB.

| NAME | COMMENT |
|---|---|
| ♀ ENT_NET | ENTIRE NETWORK |
| 🖥 Libretto100 | H◯◯  M◯◯ |
| 🖥 Snpc00 | DEXX Opxxx GXxxx |
| 🖥 Snpc01 | |
| 🖥 Snpc02 | ◯◯ (GAXXXX1234) |
| 🖥 Snpc04 | F◯◯-5678  w◯◯◯ |
| 🖥 Snpc05 | K◯◯ MACHINE |
| 🖥 Snpc06 | ◯◯◯◯ MACHINE |

[ EXECUTE ]   [ CANCEL ]

FIG. 25

MEMORY MAP OF
FD/CD-ROM

| DIRECTORY |
| --- |
| 1ST DATA PROCESSING PROGRAM PROGRAM CODES FOR FLOWCHART OF FIG. 9 |
| 2ND DATA PROCESSING PROGRAM PROGRAM CODES FOR FLOWCHART OF FIG. 16 |
| 3RD DATA PROCESSING PROGRAM PROGRAM CODES FOR FLOWCHART OF FIG. 22 |
| 4TH DATA PROCESSING PROGRAM PROGRAM CODES FOR FLOWCHART OF FIG. 24 |
| |

DATA PROCESSING APPARATUS AND DISPLAY PROCESSING METHOD

BACKGROUND OF THE INVENTION

1. Field of the Invention

The present invention relates to a data processing apparatus which can perform data communication with various data processing apparatuses connected on a predetermined communication medium, a display processing method, and a memory medium in which a computer-readable program is stored.

2. Related Background Art

In recent years, in a network system environment, peripherals such as a PC and printer, scanner, and digital camera have spread, and there have increased needs for reading image data to prepare an electronic document, and for editing and printing the document. Moreover, networks such as LAN have spread, and there also have increased needs for sharing a printer, modem, and image scanner on the network. By sharing the peripherals such as the printer and scanner on the network, expenses are depressed, and the installation place of the peripheral can be minimized.

SUMMARY OF THE INVENTION

When a very large number of peripherals are connected on the network, however, the user cannot easily identify his necessary peripheral. Moreover, since the connection information, and the like of the peripherals are displayed by every type of peripheral, the user has to check the connection situation of each peripheral, and the operation is difficult and intricate.

Furthermore, since the user's host computer checks the states (information) of all the peripherals on the network, the network is loaded, and it sometimes takes time to check the states.

The present invention has been developed to solve the above-described problems. According to the present invention, when the user desires to see the constitution of a network system as occasion demands, simply by switching/designating a normal display and a favorites display, the entire constitution of the network system and the operation situation of the peripheral can be grasped, or with respect to favorite devices (peripherals) registered by the respective users, the operation situations of the devices can be grasped.

Furthermore, any display can present a freely changing network system environment so that it can visually easily be seen.

Specifically, according to the present invention: (1) the recognizability of the network system environment is remarkably enhanced; (2) with the enhancement of the visibility of the network system environment, the user can efficiently utilize the respective peripherals and other data processing apparatuses; and (3) the user can efficiently perform various data processings executed by utilizing the entire network system environment or favorite network system environment.

Moreover, according to the present invention: (4) the user's data processing apparatus can obtain favorite information managed by the other data processing apparatuses, and incorporate the information on a favorites display screen; (5) each user can recognize his favorite network system environment with any data processing apparatus; and (6) when the network peripheral is utilized from the other data processing apparatuses to perform a data processing, the user can operate an intended device in the same operation environment as the operation environment of his data processing apparatus.

Furthermore, according to the present invention: (7) the network system environment (favorite network system environment) customized in the certain data processing apparatus can be reflected on the other data processing apparatuses; (8) the device registration operation necessary for displaying the same favorite network system environment to the respective users is remarkably alleviated; and (9) the user can arbitrarily handle the favorite network system environment with a simple operation.

BRIEF DESCRIPTION OF THE DRAWINGS

FIG. 9 is a flowchart showing one example of a first data processing procedure in the data processing apparatus of the present invention.

FIG. 15 is a diagram showing one example of the message window displayed on the CRT of the data processing apparatus shown in FIG. 2.

FIG. 23 is a diagram showing one example of a sender setup window in the data processing apparatus according to a fourth embodiment of the present invention.

FIG. 25 is an explanatory view of the memory map of a memory medium for storing various data processing programs readable by the data processing apparatus of the present invention.

DETAILED DESCRIPTION OF THE PREFERRED EMBODIMENTS

<Favorites Display>

Figure 1:
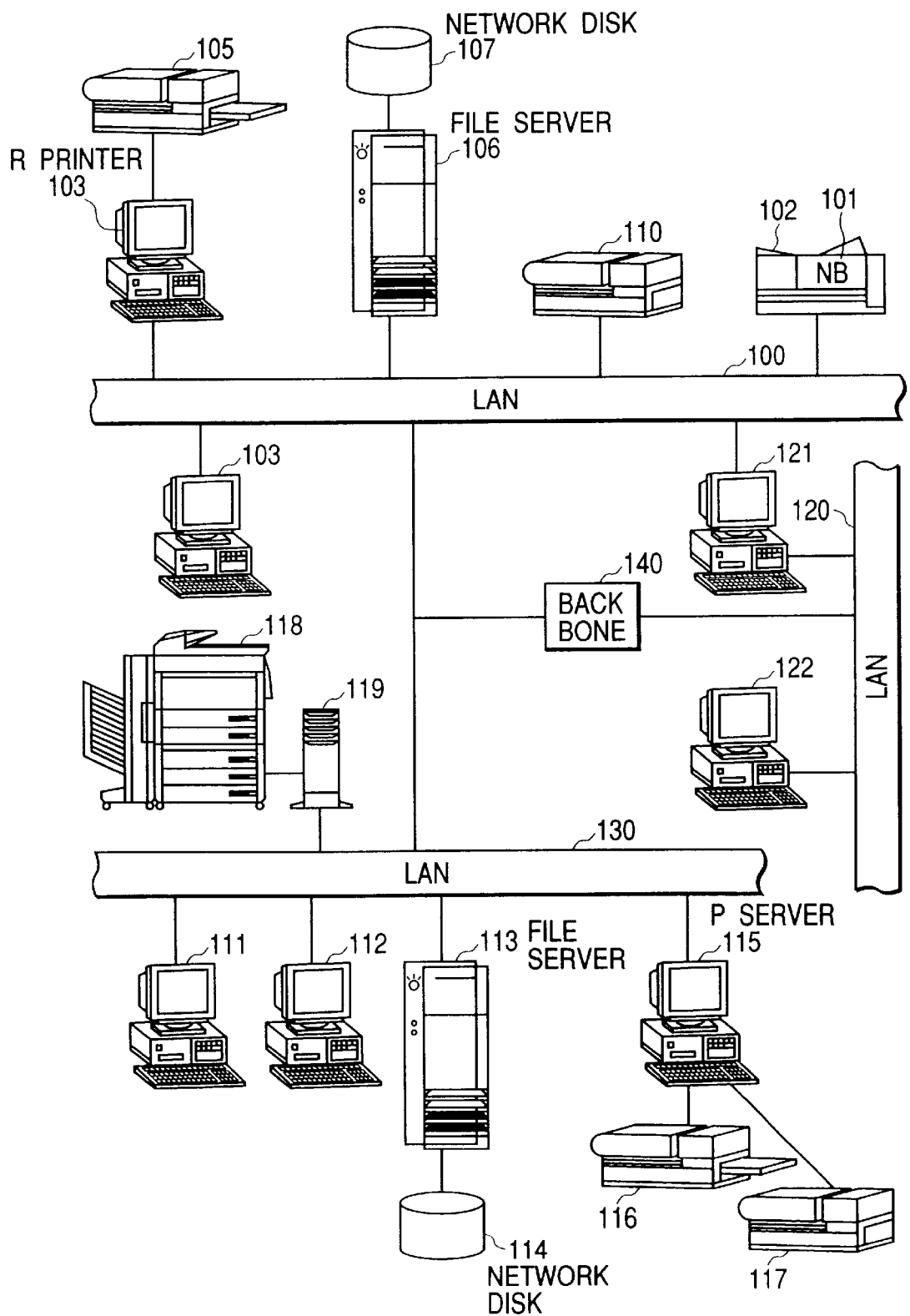
FIG. 1 is an explanatory view of the system constitution of network devices including a data processing apparatus of the present invention.

FIG. 1 is an explanatory view of the network system constitution by the network devices including a data processing apparatus of the present invention.

In FIG. 1, a printer 102 is a printer including an open architecture, and is connected to a network via a network board (NB) 101. The NB 101 is connected to local area networks (LAN) 100, 120, 130 via local area network interfaces such as Ethernet interface 10Base-2 including a coaxial connector, and 10Base-T including RJ-45.

A plurality of personal computers (PC) such as PC 103, PC 104, PC 111, PC 112 are also connected to LAN 100, 130. These PCs can communicate with the NB 101 under the control of a network operating system.

Therefore, one of the PCs, for example, the PC 103 can be used as a network device managing PC. Moreover, a printer 105 can locally be connected as a local printer to the PC 104.

Moreover, PC 106 functions as a file service. The PC 106 is connected to the LAN 100, and controls the access to a file stored in a network disk 107 with a large capacity (e.g., 10 billion bytes).

The PC 104 functions as a print server. The PC 104 controls the printing to the locally connected printer 105, or to the printer 102 in a remote place.

Similarly, a scanner server PC 115 manages a locally connected scanner 117, or a scanner 110 in the remote place. The scanner 110 is connected to the LAN 100 via the network board, and the like. Moreover, a copying machine 118 provides the function of the printer or the scanner under the management/control of an image processing unit 119.

In the network shown in FIG. 1, network software such as Novell and UNIX can be used to efficiently perform communication among various network members. For example, software NetWare (registered trademark of Novell Co., hereinafter omitted) of Novell Co. can be used. Since the software package is described in detail in on-line documentation contained in NetWare package (contained in the NetWare package from Novell Co.), the description thereof is omitted here.

Each of the PC 103 and PC 104 can generate a data file, transmit the generated data file to the LAN 100, or receive a file from the LAN 100, and further display and/or process the files.

FIG. 1 shows the personal computer devices (PC), but other computer devices suitable for execution of the network software may be used. For example, when the UNIX software is used, UNIX workstations may be connected to the network. These workstations are used together with the shown PCs.

The LAN 100 usually presents services to relatively local user groups, for example, to the user groups, and the like on one floor or on a plurality of continuous floors in one building. On the other hand, when the users are present in different buildings or prefectures, that is, when the users are far from one another, a wide area network (WAN) may be constructed.

Basically, the WAN is formed by connecting several LANs via high-rate digital wires such as an integrated services digital network (ISDN). The WAN is an aggregate of LANs. For example, as shown in FIG. 1, the WAN is formed by connecting the LAN 100 to the LAN 120 via a back bone 140. The devices connected to the LAN 100, LAN 120, LAN 130 can access the functions of devices connected to other LANs via the WAN connection.

Figure 2:
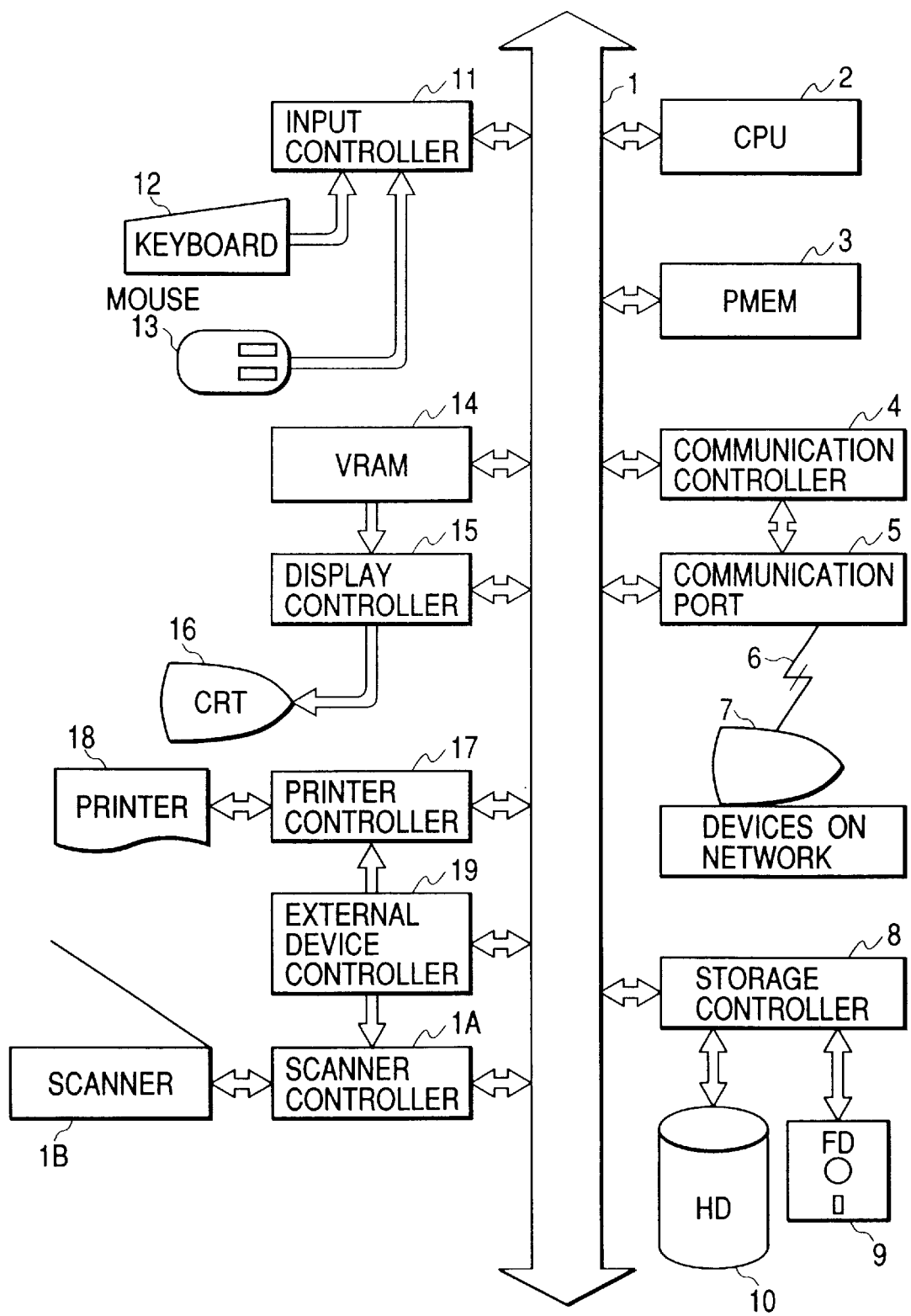
FIG. 2 is a block diagram showing the constitution of the data processing apparatus according to a first embodiment of the present invention.

FIG. 2 is a block diagram showing the data processing apparatus of the present invention. The data processing apparatus is constituted so that communication can be performed with other data processing apparatuses locally connected to predetermined peripherals (including the printer, scanner, modem, composite image processing apparatus, and the like) via communication media (not shown) such as Ethernet and another LAN in accordance with a predetermined protocol.

FIG. 2 shows a system bus 1, and respective components described later are connected to this system bus 1. Numeral 2 denotes a central processing unit (CPU).

Numeral 3 denotes a program memory (abbreviated as PMEM). The program for the present processing is appropriately selected from a hard disk 10, read to the PMEM, and executed by the CPU 2. Moreover, the data inputted via a keyboard 12 is stored as code information in the PMEM 3 which also serves as a text memory.

A communication controller 4 controls input/output data in a communication port 5. A signal outputted from the communication port 5 is transmitted to the communication port of another device 7 on the network via a communication line 6.

The communication with the printer or the image scanner shared on the network is performed via the communication controller 4. Additionally, the network such as LAN is described in the present embodiment, but the communication port and communication line connected to the communication controller 4 may comprise general public lines.

An external storage controller 8 controls the access to data file disks such as a floppy disk (abbreviated as FD) 9 and hard disk (abbreviated as HD) 10.

An input controller 11 is connected to the keyboard 12 and a mouse or another input device 13. By operating the keyboard 12, an operator can transmit an operation command to the system. Numeral 16 denotes a CRT, and a pointing device (abbreviated as PD) is used for the user to designate the processing of image information on the CRT 16. In the present embodiment, the mouse 13 is used as the pointing device.

The user uses the mouse 13 to arbitrarily move a cursor on the CRT 16 in X, Y directions, and selects a command icon on a command menu to designate the processing. Additionally, the edition object, drawing position, and the like are also designated.

Numeral 14 denotes a video image memory (abbreviated as VRAM). The drawing data (bit map data) to be displayed on the CRT 16 is developed to the VRAM 14. The drawing data is appropriately read via a display controller 15 and the content is displayed on the CRT 16. A printer controller 17 controls the data output to a connected printer 18.

An image scanner controller 1A controls the image scanning of a connected image scanner 1B. Additionally, an external device controller 19 controls the operation of an external device via the printer controller 17 or the image scanner controller 1A.

Additionally, the constituting elements of the image scanner controller 1A and image scanner 1B are essential for the image scanner server device in the present invention. However, the client-side device can use the same constituting elements on the server side via the communication controller 4 and communication port 5 as described above.

Furthermore, in the constitution of FIG. 2, the image scanner controller 1A and image scanner 1B are physically separate components. However, even when the image scanner 1B is one component including the image scanner controller 1A, a similar function is provided.

Additionally, the program stored in the ROM in the present embodiment may also be stored in memory media such as the hard disk (HD) or floppy disk (FD) directly connected to the device. Furthermore, the program may be stored on the other devices connected via the network. Moreover, the program of the present invention can be supplied to the system or device via the memory media such as the hard disk (HD) and floppy disk (FD) or the network.

Figure 3:
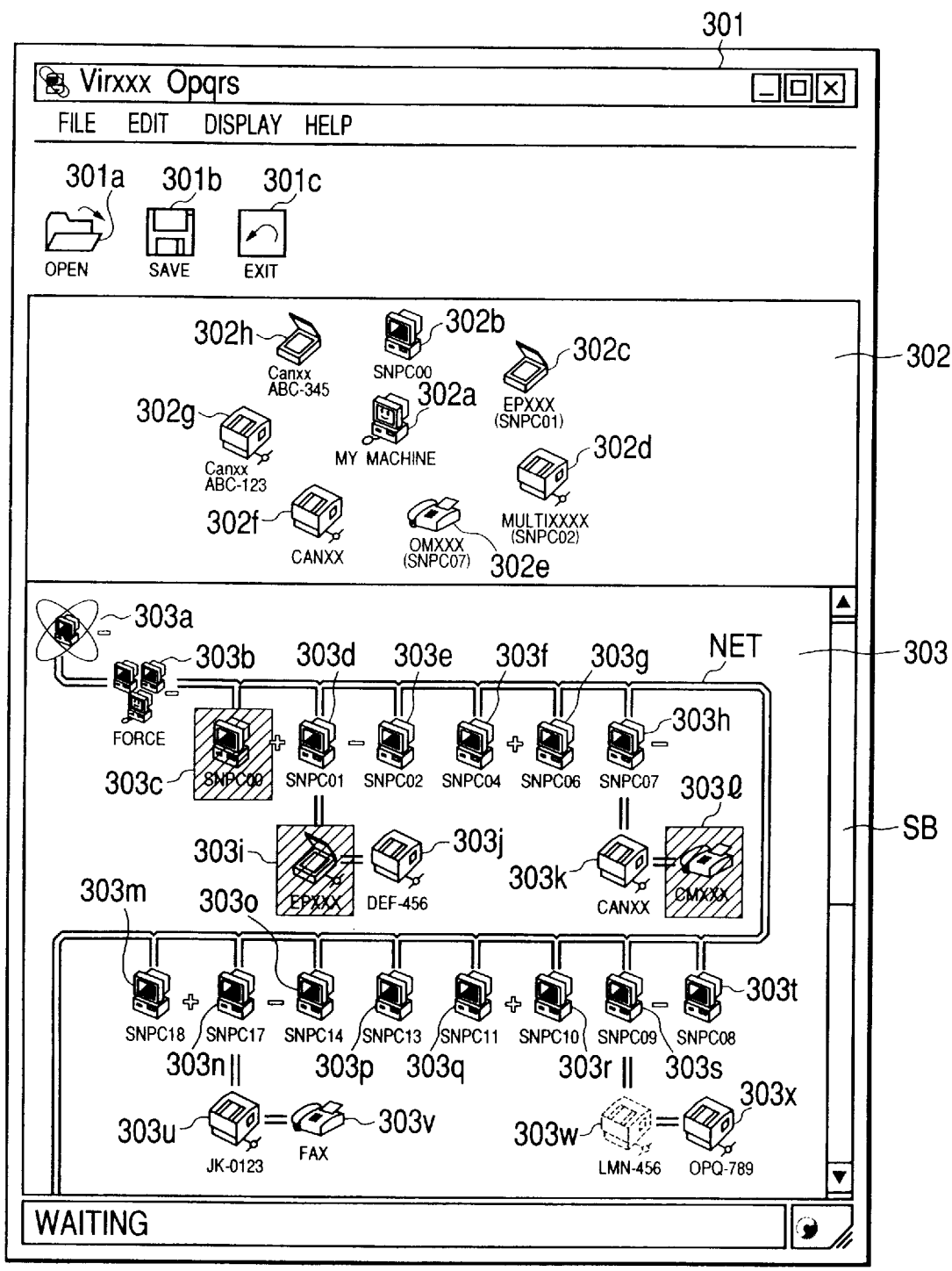
FIG. 3 is a diagram showing one example of a favorites display edition screen displayed on CRT of the data processing apparatus shown in FIG. 2.

FIG. 3 is a diagram showing one example of a favorites display edition screen displayed on the CRT 16 of the data processing apparatus shown in FIG. 2. This screen is displayed while an application for visually displaying the state of the network system environment is operating.

In FIG. 3, numeral 301 denotes an edition screen. The edition screen is constituted of a menu, tool bars 301a to 301c, a main window 303 in which icons indicative of PCs and peripherals are displayed, and a favorites display window 302. Additionally, the tool bars are different from those in the subsequent drawings such as FIG. 5, and comprise icons for edition (icons indicating open, save, and exit).

Numeral 302 denotes the "favorites display" window. The PCs and peripherals registered in the favorites display are displayed. In the "favorites display" window 302, icons 302a to 302h indicate the PCs and peripherals registered in the favorites display. The method of displaying these icons has been described above.

The "normal display" window 303 displays all PCs and peripherals on the network. In the "normal display" window 303, icons 303a to 303x indicate all the PCs and peripherals on the network. In this example, for the convenience of the screen, all the icons are not displayed. However, the user can move a scroll bar SB disposed beside the screen to confirm all the PCs and peripherals. Moreover, the icons 303c, 303i, 303l of the PCs and peripherals already registered in the favorites display are displayed with changed display shapes. Therefore, the user can check the PCs and peripherals which are registered in the favorites display.

Figure 4:
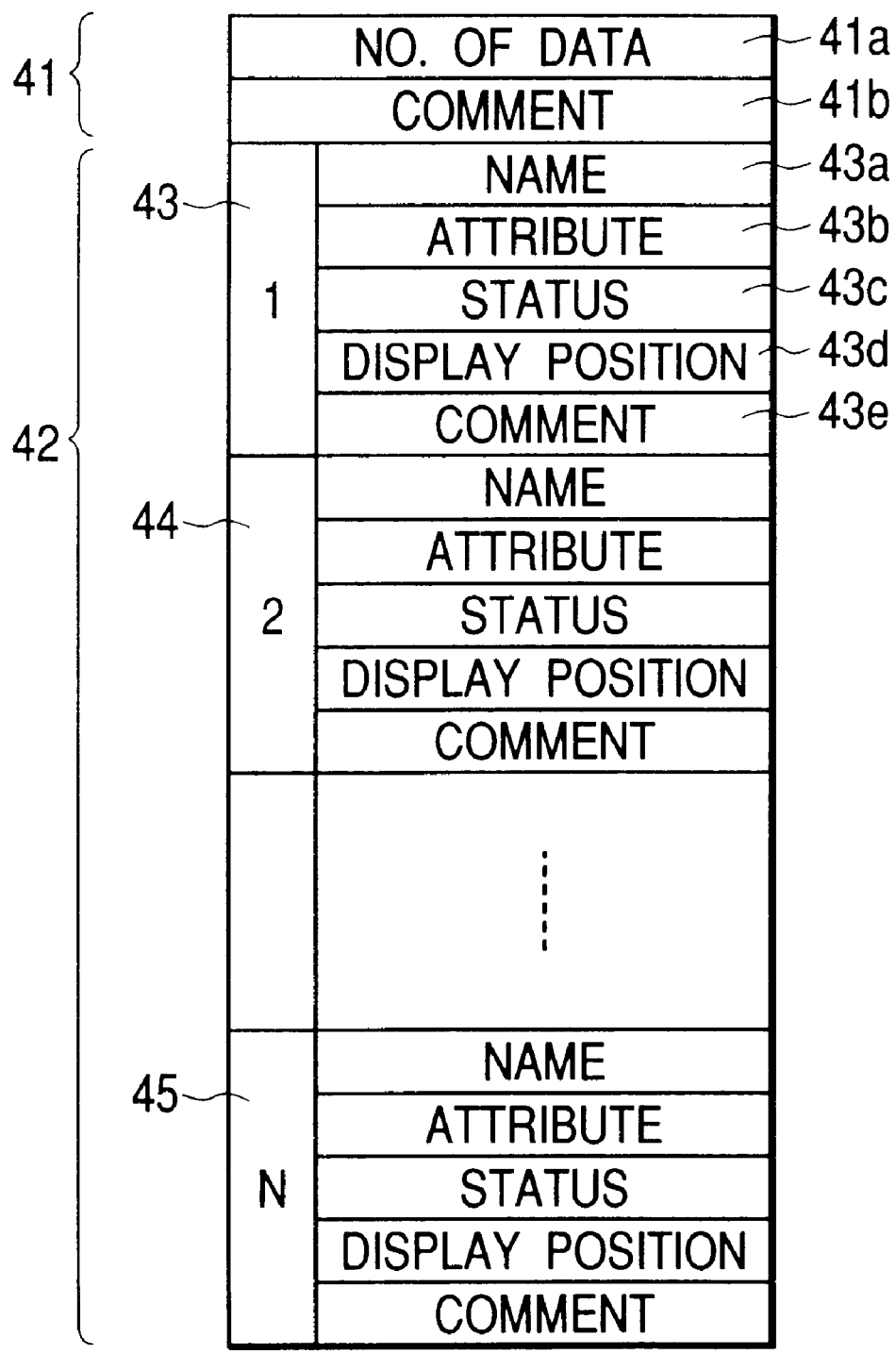
FIG. 4 is a diagram showing one example of a structure for storing the information registered in the data processing apparatus shown in FIG. 2.

FIG. 4 is a diagram showing one example of a structure for storing the information of the PCs and peripherals in the data processing apparatus shown in FIG. 2. In FIG. 4, numeral 41 denotes a header section. The header section 41 is constituted of the number of data 41a of the registered PCs and peripherals and a comment 41b.

Numeral 42 denotes a data section. The data section 42 stores the information on N devices (PCs or peripherals). Numerals 43, 44, 45 denote the information on one device. The name of the registered device is stored in 43a. The name data 43a includes, for example, "XXX123", and indicates the device type, and the like. Attribute data 43b is data for identifying PC, printer, scanner, FAX modem, and the like. Status information 43c includes information such as "being operated", "paper shortage", "driver is not installed". Screen display position information 43d indicates the position on the screen in which each registered device is displayed. Comment 43e includes a comment on this device. The data section 42 stores the number of registered data (the data comprises one set of the above-described 42a to 42e) as shown by the number of data 41a. Additionally, this structure stores the information of the PCs and peripherals of the entire network, or stores the information of the PCs and peripherals registered in the edition screen.

Figure 5:
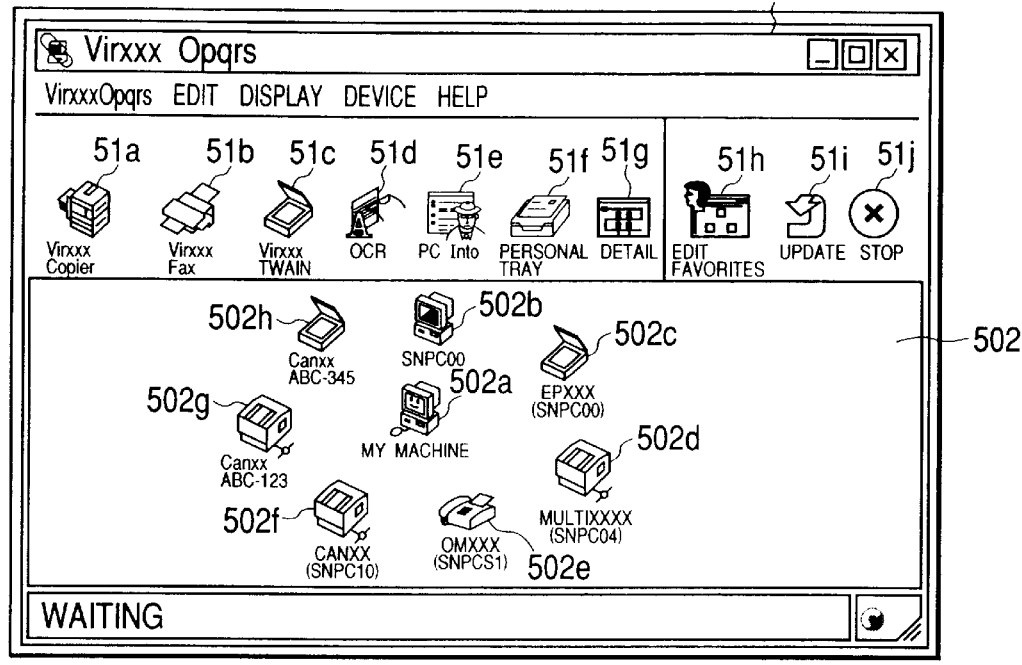
FIG. 5 is a diagram showing one example of a first favorites display screen displayed on the CRT of the data processing apparatus shown in FIG. 2.

FIG. 5 is a diagram showing one example of a first favorites display screen (favorites display window) displayed on the CRT 16. This screen corresponds to the favorites edition screen (FIG. 3) displayed during the operation of the application for visually displaying the state of the network system environment.

In FIG. 5, numeral 501 denotes an application screen. The screen 501 includes a main window 502 in which the menu, tool bars 51a to 51j, and icons 502a to 502h indicative of PCs and peripherals are displayed. The tool bars 51a to 51j have certain functions, respectively.

The icon 502a represents an own machine (data processing apparatus on which this window is displayed). Additionally, the icon shapes differ with device types such as the PC, printer, scanner, and FAX modem. Moreover, since the own machine is a special device, it is distinguished from other PCs on display. Additionally, in the present embodiment, smile is displayed on the screen of the icon 502a. The user may generate a favorite icon clearly distinguishable from the icons of other devices, and use the icon as the icon indicative of the own machine.

The icons 502b to 502h represent the registered PCs or peripherals, respectively. The user can select the icons to execute various processings by the operation of the mouse 13 or the key operation of the keyboard 12.

For example, when the user selects the tool bar 51g on the screen 501 shown in FIG. 5, the screen display of the CRT 16 can be switched to the normal display (corresponding to the display form described later and shown in FIG. 7). Moreover, when the tool bar 51h is selected, the mode is switched to a favorites display edition mode.

Additionally, in the present embodiment, during the favorites display, the icon is disposed on a circle so as to facilitate the operation. The user can freely change the icon position by the mouse operation.

Figure 6:
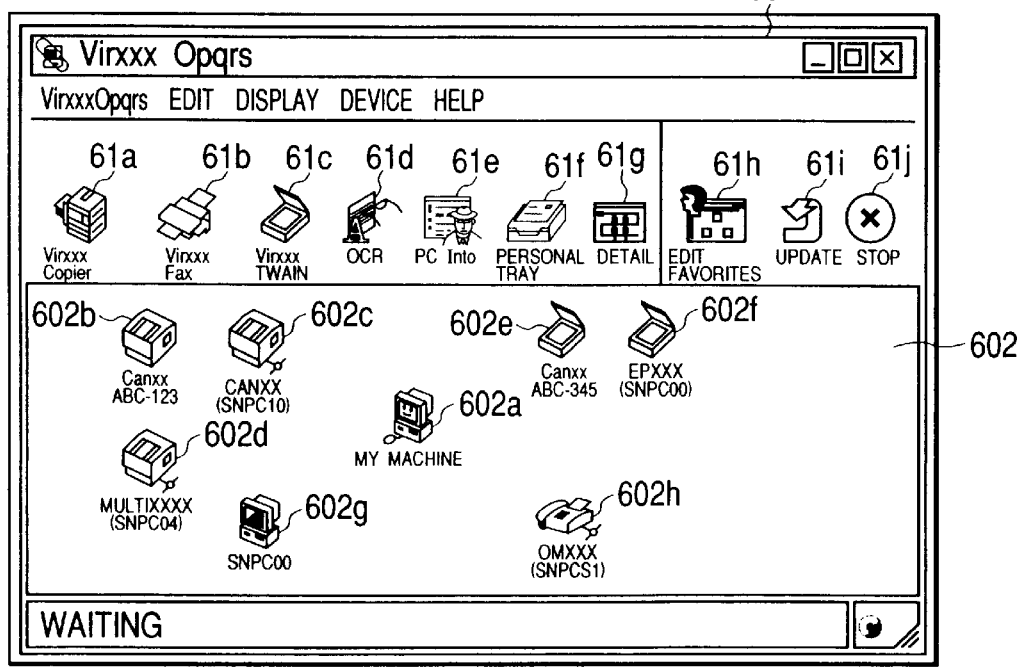
FIG. 6 is a diagram showing one example of a second favorites display screen displayed on the CRT of the data processing apparatus shown in FIG. 2.

FIG. 6 is a diagram showing one example of a second favorites display screen displayed on the CRT 16. This screen corresponds to the favorites edition screen displayed during the operation of the application for visually displaying the state of the network system environment. Additionally, the respective functions are the same as those of FIG. 5. In the screen of FIG. 6, the positions in which the icons are disposed are divided by the device types such as the printer, scanner, FAX modem, and PC. Specifically, since the icons are distinguished from one another by the device type, the user operability and visibility are enhanced in the screen display.

Figure 7:
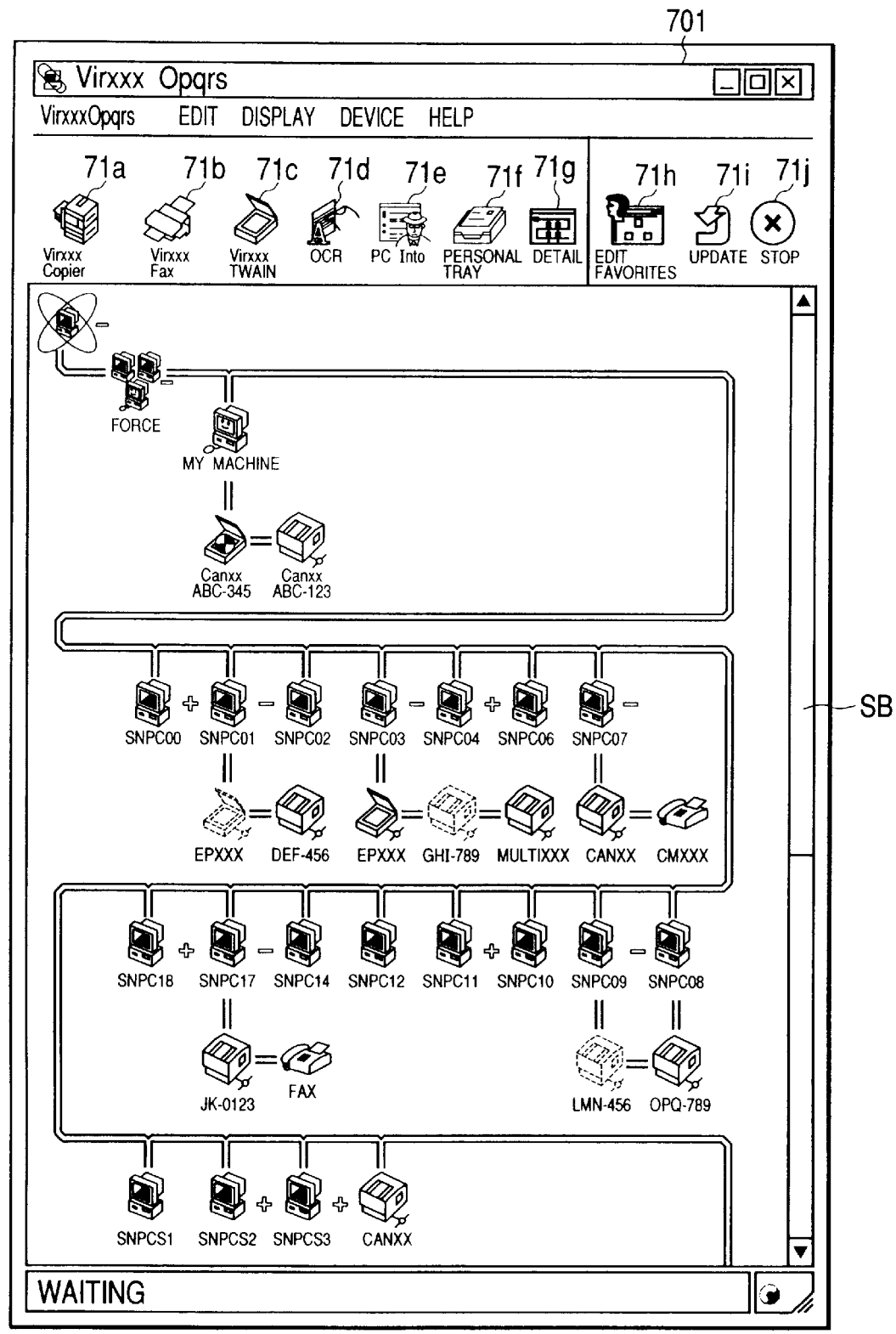
FIG. 7 is a diagram showing one example of a normal display screen displayed on the CRT of the data processing apparatus shown in FIG. 2.

FIG. 7 is a diagram showing one example of a normal display screen displayed on the CRT 16. The same components as those of FIG. 3 are denoted by the same reference numerals. In FIG. 7, numerals 71a to 71j denote tool bars. The functions of the respective tool bars and icons are the same as those of FIG. 5. In the display screen of FIG. 7, when the user operates the mouse to designate the tool bar 71g with the cursor, the display screen is switched to the favorites display screen shown in FIG. 5 or FIG. 6.

Figures 8, 10:
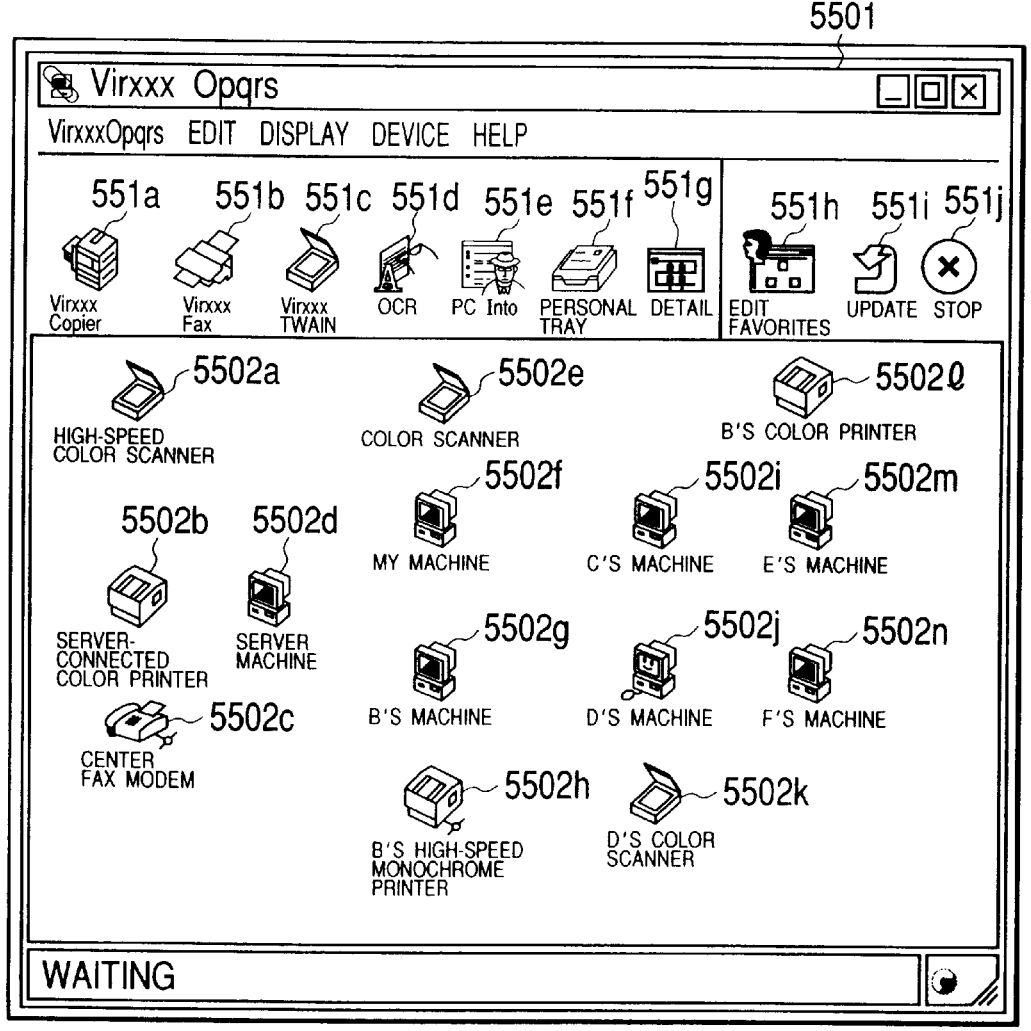
FIG. 8 is a diagram showing one example of a pop-up menu for performing an instruction of register/delete on the favorites edition screen shown in FIG. 3.
FIG. 10 is a diagram showing one example of the favorites display screen in the data processing apparatus according to a second embodiment of the present invention.

FIG. 8 is a diagram showing one example of a pop-up menu for performing an instruction of register/delete on the favorites edition screen shown in FIG. 3.

In FIG. 8, when the favorites display window is displayed, a "register" item is displayed in gray so that the item is not selected. When the normal display window is displayed, a "delete" item is displayed in gray so that it is not selected. Moreover, when the "register" is selected during the display of the favorites display window, the icon is registered on the left upper position of the favorites display window. When the icon is already present in this position, the icon is registered in a registerable position closest to the point.

FIG. 9 is a flowchart showing one example of a first data processing in the data processing apparatus of the present invention. Additionally, S901 to S911 denote the respective steps.

First, in step S901, a display method is judged. For example, the method is judged in accordance with display method setup data stored on the PMEM 3. Additionally, as the types of the display method, in the present embodiment, there are a "normal display" to display all PCs or peripherals on the network, and a "favorites display" to display only the registered PCs or peripherals.

Therefore, it is concretely judged in the step S901 whether the "favorites display" is selected. When it is judged that the "favorites display" is selected, the flow advances to step S902. Here, the registration information (information of PCs and peripherals registered in the edition screen) stored in memories such as the hard disk 10 is read, and the connection state, operation situation, and other information on these devices are obtained. Here, instead of performing the obtaining processing with respect to all the PCs or peripherals on the network, the processing is performed with respect to only the registered PCs or peripherals.

Subsequently, in step S903, the icons indicative of the PCs and peripherals are displayed on the screen of CRT 16 based on the registration information, for example, in the form shown in FIG. 5 or 6.

On the other hand, when it is judged in the step S901 that the favorites display is not set, the flows advances to step S904 by judging that the normal display is set. Subsequently, in the step S904, the information such as the connection state and operation situation of all the PCs and peripherals on the network are obtained. Then, in step S905, based on the obtained information, the icons indicative of all the PCs and peripherals are displayed on the screen of CRT 16 in the form shown in FIG. 7.

Subsequently, after the icons of the PCs and peripherals on the network are displayed, it is judged in step S906 whether the favorites display is edited. To edit the favorites display, the user selects the item indicative of edition from the menu, or selects the icon-displayed tool bar 51h shown in FIG. 5. Here, when it is judged that the favorites display edition is not instructed, the flow advances to step S911.

On the other hand, when it is judged in the step S906 that the favorites display edition is instructed, the flow advances to step S907. In the step S907, the information of the PCs and peripherals registered in the favorites display are read from the registration information, and the information (connection state, operation situation, and other information) of all the PCs and peripherals on the network are also read. Subsequently, the favorites display and normal display are simultaneously displayed as shown in FIG. 3.

Subsequently, in step S908, the registration operation of the PCs and peripherals to the favorites display is performed. The registration operation includes the operation by the mouse 13 shown in FIG. 2. In the present embodiment, for example, by dragging/dropping each icon (selecting and moving the icon) to the favorites display window 302 from the normal display window 303, the icon can be registered in a position in which the click button of the mouse 13 is released. Moreover, conversely, by dragging/dropping the icon to the normal display window from the favorites display window, the registration of the device can be deleted from the favorites display. Moreover, as another operation, by displaying the pop-up menu shown in FIG. 8 on the icon of each window, the registration or deletion can be performed.

Next, it is judged in step S909 whether an instruction for exit of the favorites display edition is performed. Additionally, the operation of finishing the favorites display edition comprises selecting the exit item from the menu, or selecting the exit icon 301c of the tool bar.

Here, when it is not judged that no exit instruction is given, the flow returns to the step S908 to continue the edition processing. On the other hand, when it is judged in the step S909 that the exit instruction is given, the flow advances to step S910. At this time, the registration information of the edited favorites display (the information of the PCs and peripherals registered in the favorites display) is saved in the memories such as the hard disk 10 and PMEM 3.

Subsequently, it is judged in step S911 whether the exit instruction is given to this application. When it is judged that no exit instruction is given, the flow returns to the step S901. When it is judged that the exit instruction is given, the processing based on the application is finished.

According to the above-described embodiment, only the PCs and peripherals registered by the user are displayed. Moreover, in order to perform the registration, the edition screen can be displayed in which the window for displaying all the PCs and peripherals shared on the network and the window for displaying only the PCs and peripherals registered by the user are displayed on the same screen so that the windows are easily seen and recognized. Therefore, the user can efficiently utilize the devices on the network, which enhances the operation efficiency.

In the above embodiment, it has been described that the user moves/indicates the icons of the intended devices (PCs and peripherals) to a favorites display area to register the favorite devices (the PCs and peripherals registered in the favorites display) on the favorites edition screen. It has also been described above that the window for displaying only the devices registered on the favorites display and the window for displaying the devices of the entire network system are switched/controlled.

<Reading of Favorites Display Setup Data>

In the following constitution, the information of the favorites devices sent from other data processing apparatuses and the information of the favorite devices of the own machine may be displayed/controlled on the same screen. The embodiment will be described hereinafter.

Figure 11:
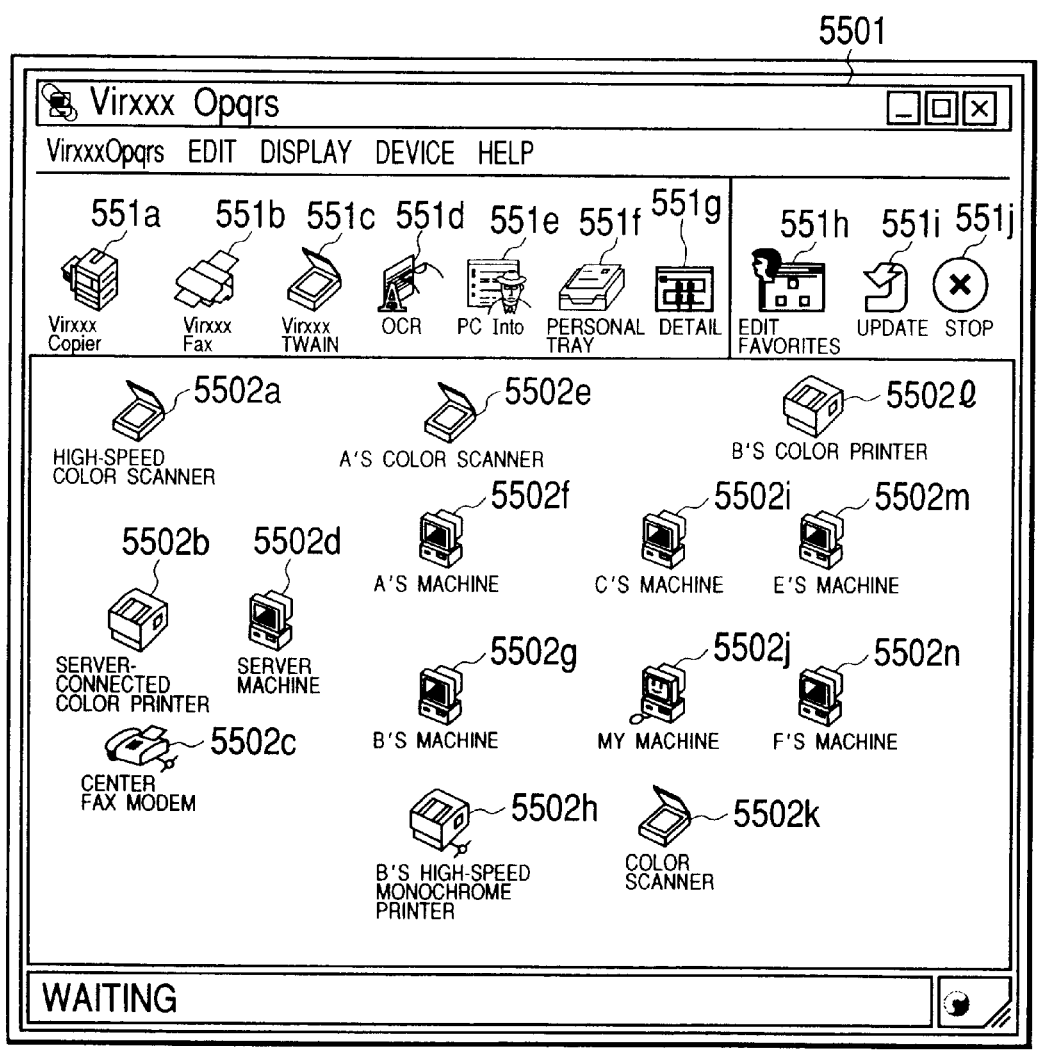
FIG. 11 is a diagram showing one example of the favorites display screen in the data processing apparatus according to the second embodiment of the present invention.

FIGS. 10 and 11 are diagrams showing examples of the favorites display screen in the data processing apparatus of the present invention. The favorites display application corresponds to the favorites display screen being operated.

In FIG. 10, numeral 5501 denotes a main window. This window displays the menu, tool bars, and icons indicative of PCs and peripherals.

Tool bars 551a to 551j have respective functions. Numeral 5502f denotes an icon indicative of an own machine. The icon shape changes with device types such as PC, printer, scanner, and FAX modem. Moreover, since the own machine is a special machine, it is displayed distinctively from the other PCs.

Additionally, the icons other than the icon 5502f indicate the respective registered PCs and peripherals. By performing the mouse operation, or the key operation with respect to these icons, various processings can be performed.

For example, by selecting the tool bar 551g, the display state can be switched to the "normal display" from the "favorites display". Moreover, the selection of the tool bar 551h enables the switch to the favorites display edition mode. Furthermore, when the double-click operation of the mouse 13 is performed on an icon 5502k of scanner, the image data can be read from the scanner.

In the present embodiment, there is one server machine (corresponding to an icon 5502d), and each of A to F owns one PC. FIG. 10 shows the favorites display prepared by the machine (corresponding to the icon 5502f) in the network system environment in which the printer, scanner, and the like are shared. Furthermore, FIG. 10 shows an example in which the machines are arranged in order of actual A to F's seats.

In FIG. 11, the main window 5501 displays the menu, tool bars, and icons indicative of PCs and peripherals.

The tool bars 551a to 551j have respective functions. In FIG. 11, numeral 5502j denotes an icon indicating the own machine. Moreover, since the own machine is a special machine, it is displayed distinctively from the other PCs. Numerals 5502a to 5502n denote icons. The icon shape changes by the device types such as PC, printer, scanner, and FAX modem.

Figure 12:
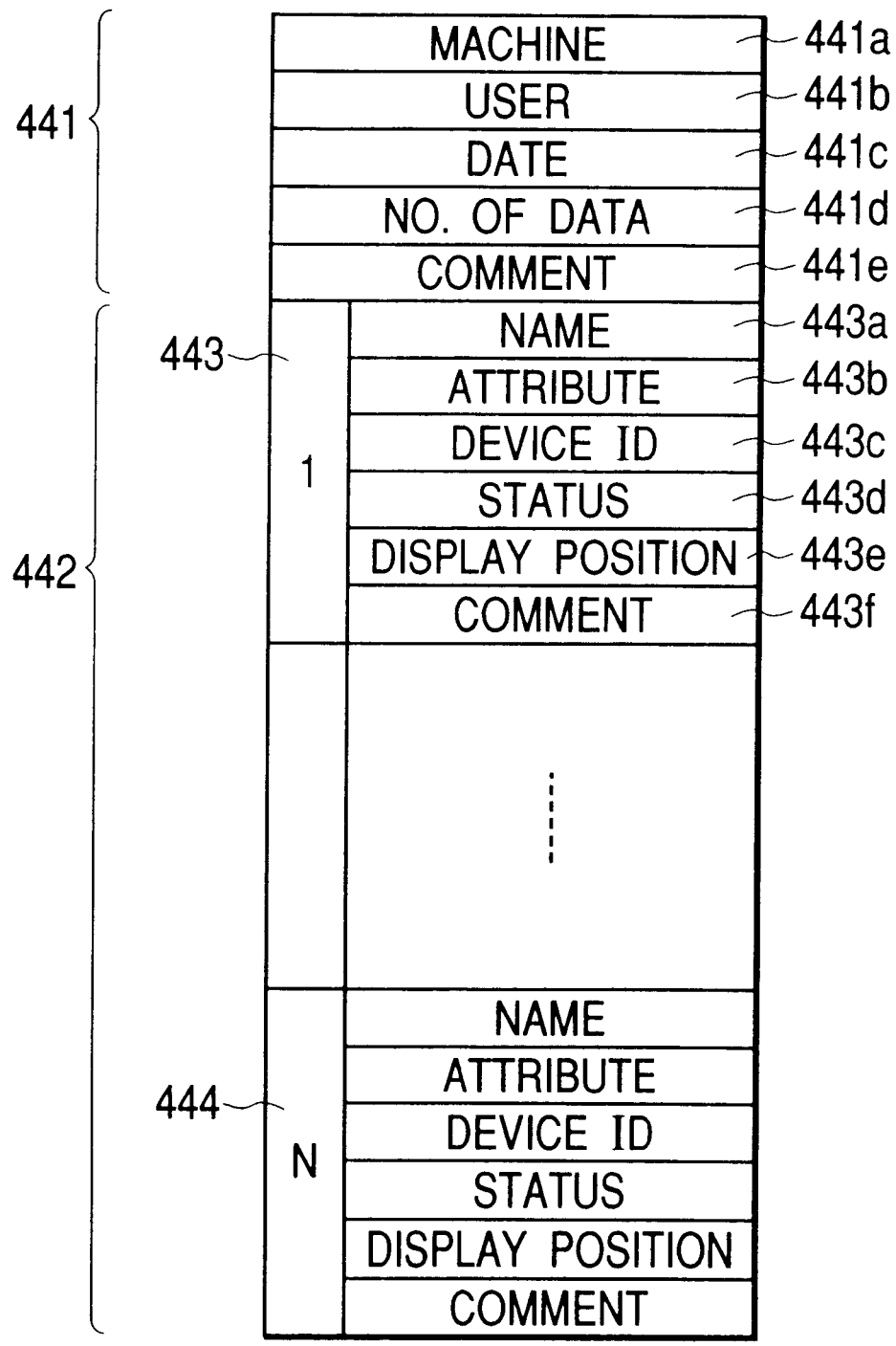
FIG. 12 is a diagram showing one example of the structure of favorites display setup data in the data processing apparatus shown in FIG. 2.

FIG. 12 is a diagram showing one example of the structure of the setup data for the favorites display (FIGS. 10 and 11) in the data processing apparatus. In FIG. 12, a header section 441 is constituted of a machine name 441a which has prepared data, a data user 441b, a data preparation date 441c, the number of data 441d, a comment 441e, and the like. Additionally, the machine name 441a may be a machine appellation or an IP address of TCP/IP protocol as long as it can univocally determine the device on the network.

Moreover, the data user 441b may be an appellation logged on the machine or any other arbitrary appellation. Furthermore, the number of registered PCs or peripherals is set to the number of data 441d.

Numeral 442 denotes a data section. In the data section 442 of FIG. 12, N devices (PCs and peripherals) are registered. Additionally, numeral 443 or 444 denotes data on each device. The data 443 is constituted of name data 443a, attribute data 443b, device ID 443c, status information 443d, display position information 443e, and comment 443f.

The names of the registered devices are stored in the name data 443a. Moreover, the data indicating the device types is stored in the attribute data 443b. Concretely, the PC, printer, scanner, FAX modem, and the like are stored. When the device comprises PC, the device ID 443c is the same as the machine name 441a. For the other devices, the machine name of the PC connected to the devices is stored.

Furthermore, the status information 443d includes information such as "being operated", "paper shortage", "driver is not installed". In the display position information 443e, the position on the screen in which the icon indicating the device should be displayed is stored.

Figure 13:
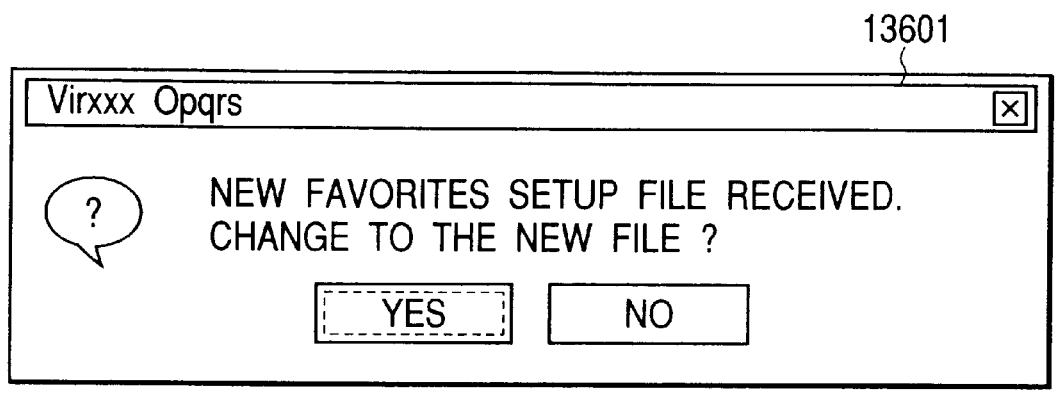
FIG. 13 is a diagram showing one example of a message window displayed on the CRT of the data processing apparatus shown in FIG. 2.
Figure 14:
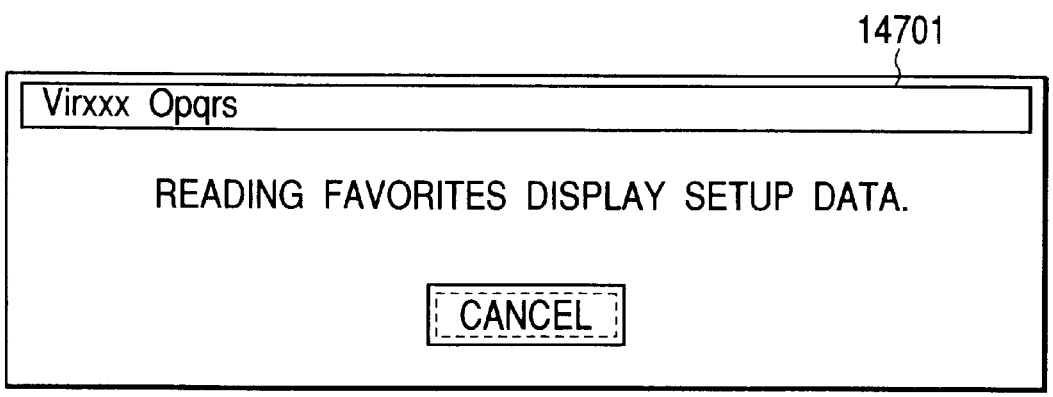
FIG. 14 is a diagram showing one example of the message window displayed on the CRT of the data processing apparatus shown in FIG. 2.

FIGS. 13 to 15 are diagrams showing examples of the message window displayed on the CRT 16 of the data processing apparatus.

Figure 16:
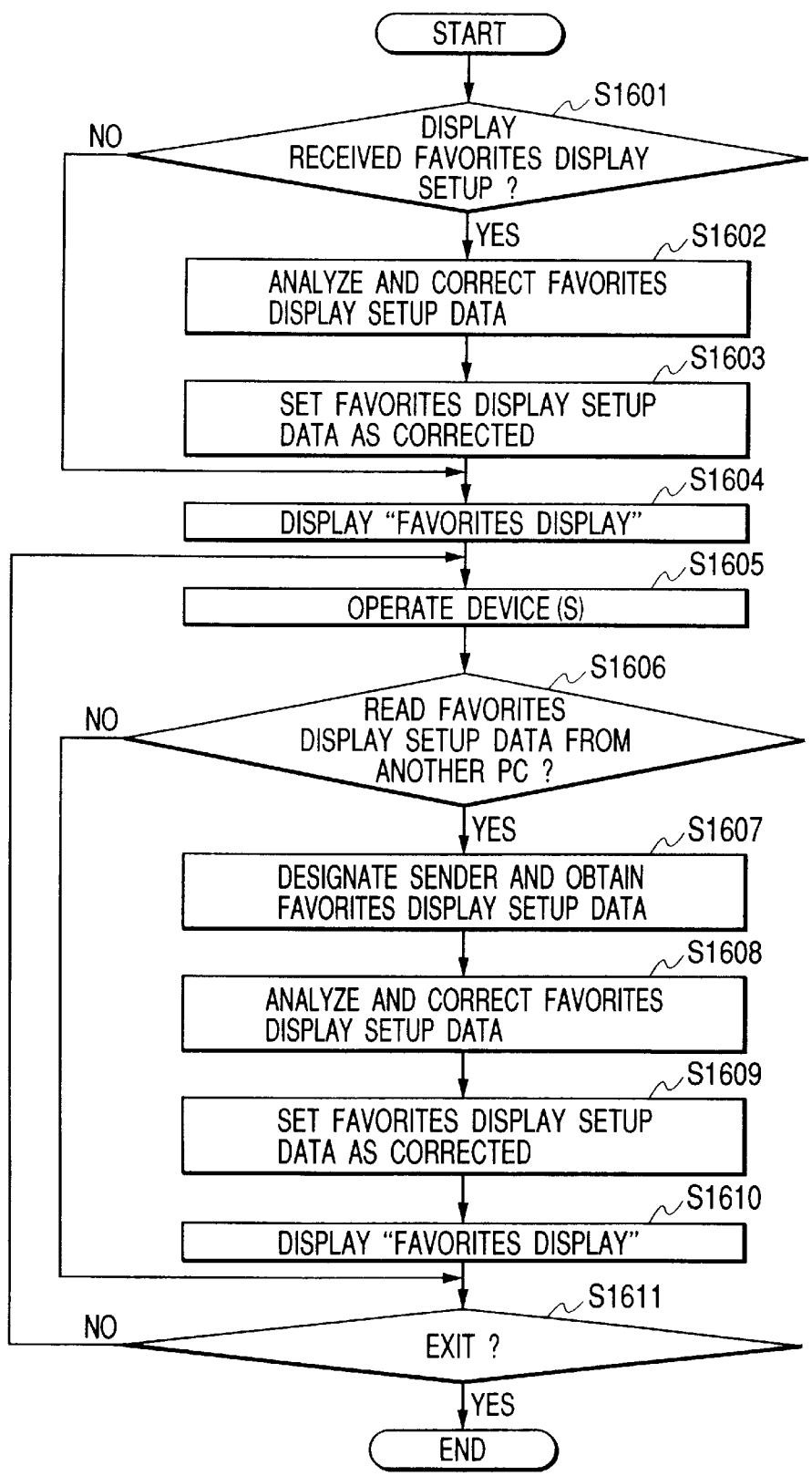
FIG. 16 is a flowchart showing one example of a second data processing procedure in the data processing apparatus of the present invention.

FIG. 16 is a flowchart showing one example of a second data processing procedure in the data processing apparatus of the present invention. Additionally, S1601 to S1611 denote respective steps. Moreover, the display form includes two types, "normal display" for displaying all the PCs or peripherals on the network and "favorites display" for displaying only the registered PCs or peripherals, and the data for the "favorites display" is hereinafter referred to as "favorites display setup data".

First, it is judged in step S1601 whether the favorites display setup data is received when the application starts (the received favorites display setup data is referred to as the received data). The judging method comprises checking the received data area on the determined PMEM 3 to judge whether the data is received, or judging whether or not the received data is present in the directory on the determined PMEM 3.

When it is judged that the favorites display setup data is received, the message is displayed to remind the user of the instruction on whether or not to read the received setup data. For example, a message 13601 shown in FIG. 13 is displayed.

Furthermore, when there is received data, it is judged based on the received data whether the favorites display is displayed. For the display, the flow advances to step S1602 to analyze the favorites display setup data. For example, a case will be described in which A's favorites display setup data shown in FIG. 10 is sent to D.

The preparation machine of the header section of the received favorites setup data indicates "A's machine", and the user indicates "A". Here, it is obtained from the setup information of the own machine that the read machine is D's machine owned by D. Therefore, the preparation machine in the header section of the received favorites setup data is corrected to "D's machine", and the user is corrected to "D". Subsequently, in step S1603, the corrected favorites display setup data is set to the machine.

On the other hand, in the step S1601, no favorites display setup data is received, or the data is received, but no favorites display is displayed based on the received data, then the flow advances to step S1604.

Subsequently, in the step S1604, the respective devices are actually displayed in accordance with the favorites display setup data set to the machine. In this case, the connection state and status information of the PCs and peripherals on the network are obtained, and the icons of the respective devices are appropriately displayed based on these information.

In the above-described example, when the A's favorites display setup data shown in FIG. 10 is sent to D, the display screen is as shown in FIG. 11. In the screen of FIG. 11, the scanner of icon 5502e is changed to "A's color scanner", the PC of icon 5502f is changed to "A's machine", the scanner of icon 5502k is changed to "color scanner", and the PC of icon 5502j is changed to "my machine".

With respect to the scanner of icon 5502k and PC of icon 5502j, the data stored in the favorites display setup data section indicate "D's machine", "D's color scanner", respectively. However, since the device ID agrees with the preparation machine, the display is changed.

Subsequently, various operations are performed in step S1605. Here, for example, the image is read using the scanner as described above, or the FAX modem is utilized to perform a FAX transmission processing.

Subsequently, it is judged in step S1606 whether the user designates the reading of the favorites display setup data from another PC. The reading designation operation is performed by the item of menu 5501 shown in FIG. 10. Here, when it is judged that the reading is designated, the flow advances to step S1607.

In step S1607, the window for designating a sender to obtain the favorites display setup data from the machine, such as a sender setup window 15801 shown in FIG. 15, is displayed on the PC display. When the user selects the sender machine and selects execute, the processing of obtaining the favorites display setup data of the machine is executed. During the execution, the message indicating the operation, such as a window 14701 shown in FIG. 14, is displayed. Here, when the user instructs cancel, the reading processing is canceled.

When the favorites display setup data is obtained in this manner, the flow advances to step S1608. In the step S1608, the processing similar to that of the step S1602 is performed. Furthermore, in steps S1609, S1610, the processing similar to that of the steps S1603, S1604 is performed, and the screen is displayed based on the changed favorites display setup data.

On the other hand, when it is judged in the step S1606 that the reading instruction is not given, the flow advances to step S1611 without executing these processings. It the step S1611 for judging whether or not the exit instruction of the application is given, when it is judged that no instruction is given, the flow returns to the step S1605 to continue the processing. When it is judged that the exit instruction is given, the processing based on the application is finished.

According to the above-described embodiment, by displaying only the PCs and peripherals registered by the user, receiving the setup data from another PC on the network, or designating another PC to obtain the data, and analyzing the data to correct the setup to an optimum setup suitable for the own machine constitution, the devices shared on the network can easily be utilized in the same setup environment on any PC. This can prevent wrong operations such as the wasteful setting operation and the use of wrong devices, and can enhance the operation efficiency.

<Receiving of Favorites Display Setup Data>

Figure 17:
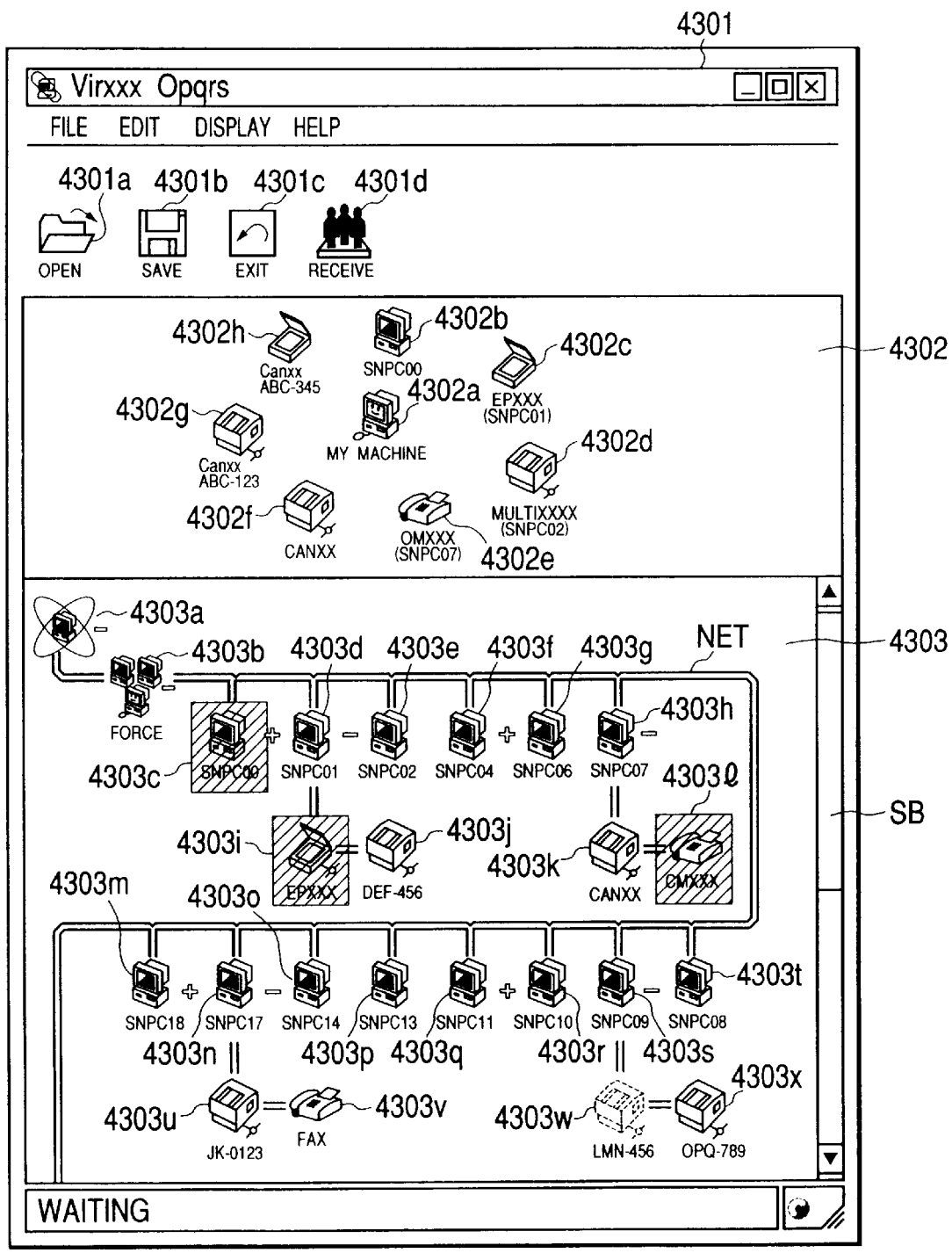
FIG. 17 is a diagram showing one example of the favorites edition display screen in the data processing apparatus according to a third embodiment of the present invention.

FIG. 17 is a diagram showing one example of the favorites edition display screen in the data processing apparatus of the present invention.

In FIG. 17, a main window 4301 displays the menu, tool bars, and icons indicating the PCs and peripherals. Numerals 4301a to 4301d denote the tool bars. Particularly, the tool bar 4301d is a tool bar for starting a reception processing. A "favorites display" window 4302 displays the PCs and peripherals registered in the favorites display. Icons 4302a to 4302h indicate the PCs and peripherals registered in the "favorites display". The method of displaying these icons are as described above.

A "normal display" window 4303 displays all the PCs and peripherals on the network. Icons 4303a to 4303x indicate all the PCs and peripherals on the network. In this example, all the icons are not displayed for the convenience of the screen, but all the PCs and peripherals can be confirmed using the scroll bar disposed beside the screen.

Moreover, the PCs and peripherals already registered in the favorites display as shown by the icons 4303c, 4303i, 4303l are displayed with changed icon display shapes (display forms). Thereby, the user can confirm the registered devices.

Additionally, the favorites display setup can be edited on the display screen. For example, by dragging/dropping each desired icon to the favorites display window 4302 from the normal display window 4303 by the operation of the mouse 13, the dragged icon can be registered in the position where the click button of the mouse 13 is released.

Moreover, conversely, by dragging/dropping the icon to the normal display window 4303 from the favorites display window 4302, the registration can be deleted from the favorites display.

Figure 18:
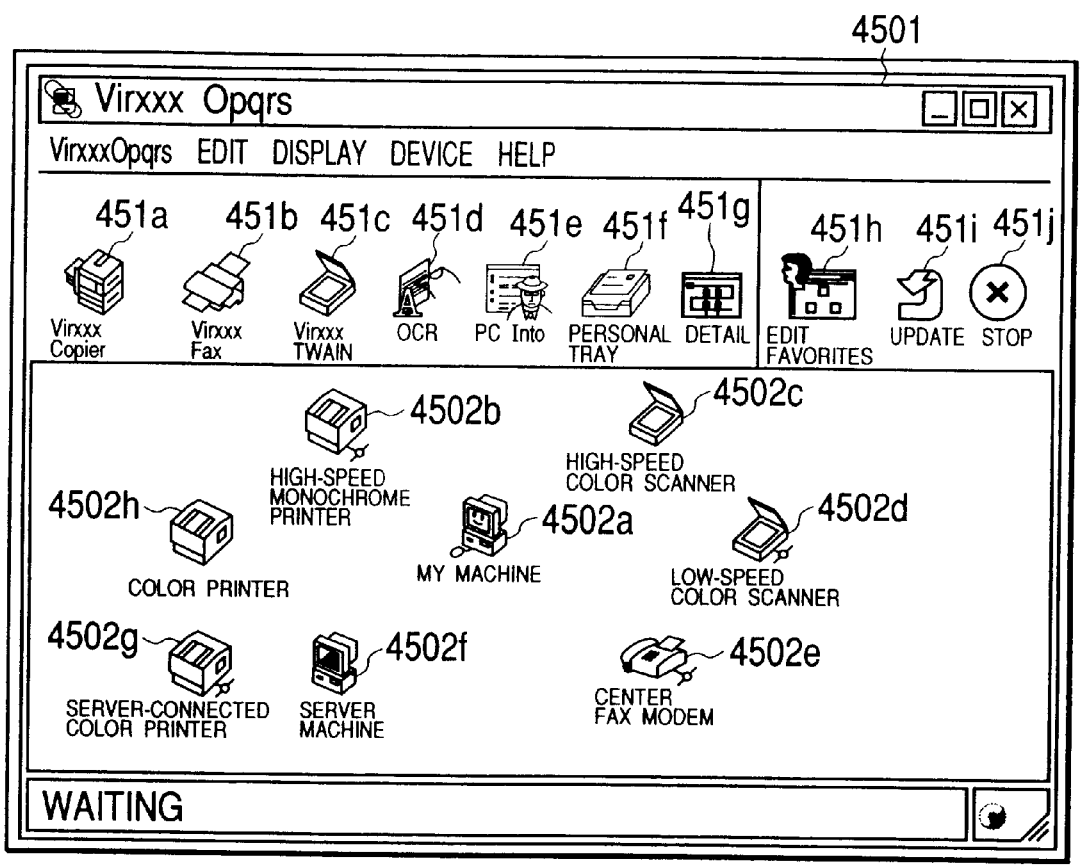
FIG. 18 is a diagram showing one example of the favorites display screen in the data processing apparatus according to the third embodiment of the present invention.

FIG. 18 is a diagram showing one example of the favorites display screen in the data processing apparatus of the present invention, and corresponds to the favorites display screen during the operation of the favorites display application.

In FIG. 18, a main window 4501 displays the menu, tool bars, and icons indicating the PCs and peripherals. The tool bars 451a to 451j have respective functions.

An icon 4502a indicates an own machine. The shape of the icon 4502a changes by the device types such as the PC, printer, scanner, and FAX modem. Moreover, since the own machine is a special device, it is displayed distinctively from other PCs.

Icons 4502b to 4502h indicate the registered PCs or peripherals. By performing the operation of the mouse 13, or the key operation of the keyboard 12 with respect to these icons 4502b to 4502h, various processings can be performed.

For example, by selecting the tool bar 451g by cursor designation, the display can be switched to the normal display. Moreover, by selecting the tool bar 451h by the cursor designation, the display switches to the favorites display edition mode. The present embodiment illustrates an example in which the devices used in common by the respective users on the network are displayed on the screen. Additionally, the user can freely change the positions of the respective icons 4502b to 4502h by the mouse operation.

Figure 19:
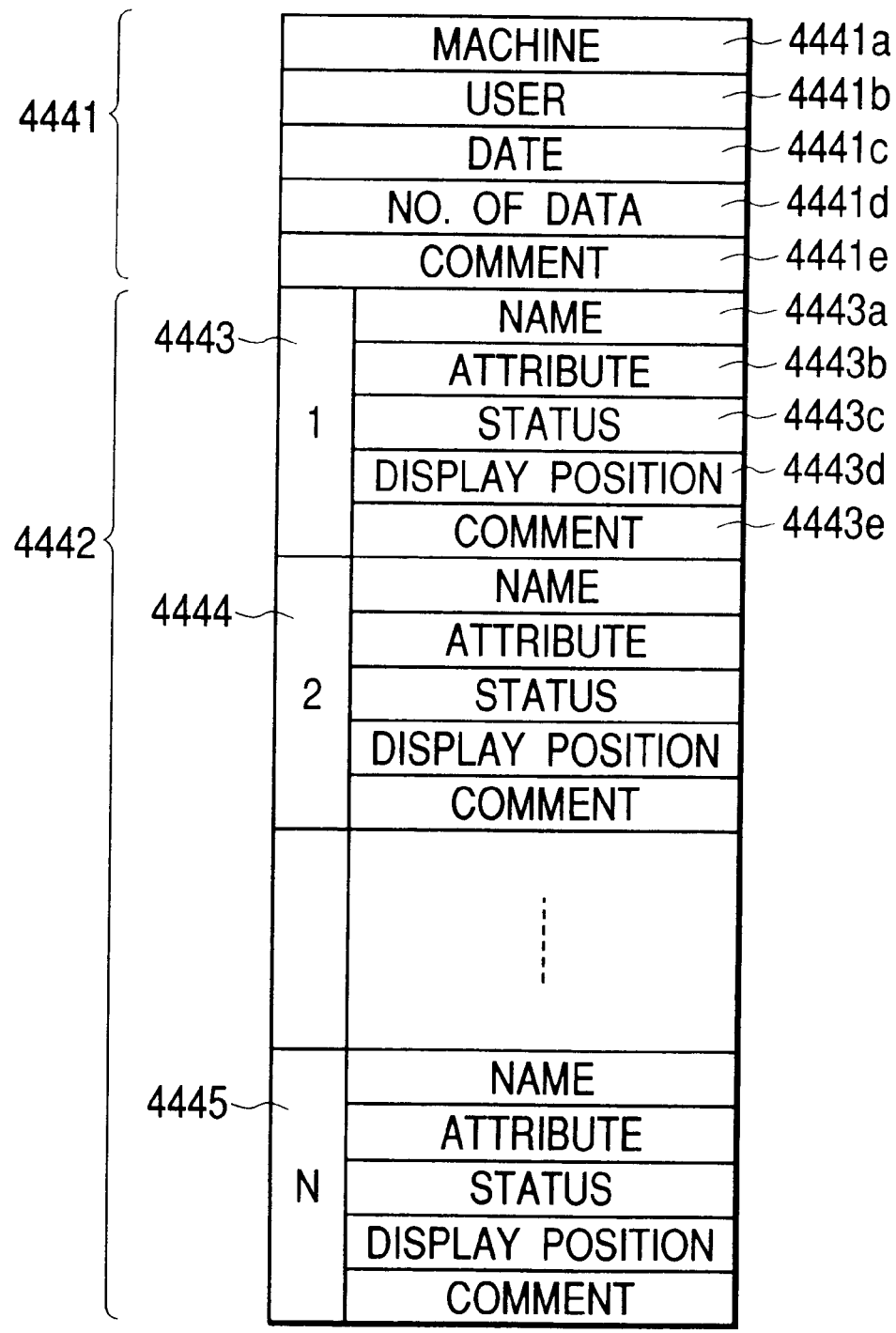
FIG. 19 is a diagram showing one example of the structure of the favorites display setup data in the data processing apparatus shown in FIG. 2.

FIG. 19 is a diagram showing one example of the structure of the favorites display setup data in the data processing apparatus. In FIG. 19, a header section 4441 is constituted of a machine name 4441a which has prepared data, a data user 4441b, a data preparation date 4441c, the number of data 4441d, a comment 4441e, and the like. Additionally, the machine name 4441a may be a machine appellation or an IP address of TCP/IP protocol as long as it can univocally determine the device on the network.

Moreover, the data user 4441b may be an appellation logged on the machine or any other arbitrary appellation. Furthermore, the number of registered PCs or peripherals is set to the number of data 4441d.

Numeral 4442 denotes a data section. In the data section 4442 of FIG. 19, N devices (PCs and peripherals) are registered. Additionally, a section 4443 is constituted of name data 4443a, attribute data 4443b, status information 4443c, display position information 4443d, and comment 4443e. The names of the registered devices are stored in the name data 4443a.

Moreover, the data indicating the device types such as the PC, printer, scanner, and FAX modem are stored in the attribute data 4443b. Furthermore, the status information 4443c includes information such as "being operated", "paper shortage", "driver is not installed". In the display position information 4443d, the position on the screen in which the icon indicating the device should be displayed is stored.

Figure 20:
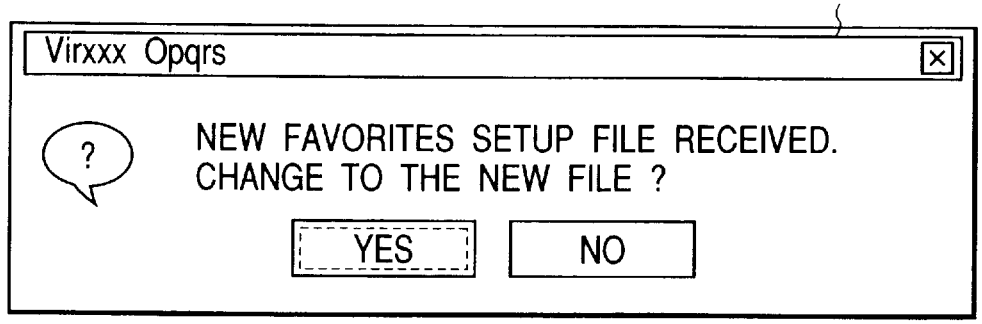
FIG. 20 is a diagram showing one example of a window displayed on the CRT of the data processing apparatus shown in FIG. 2.
Figure 21:
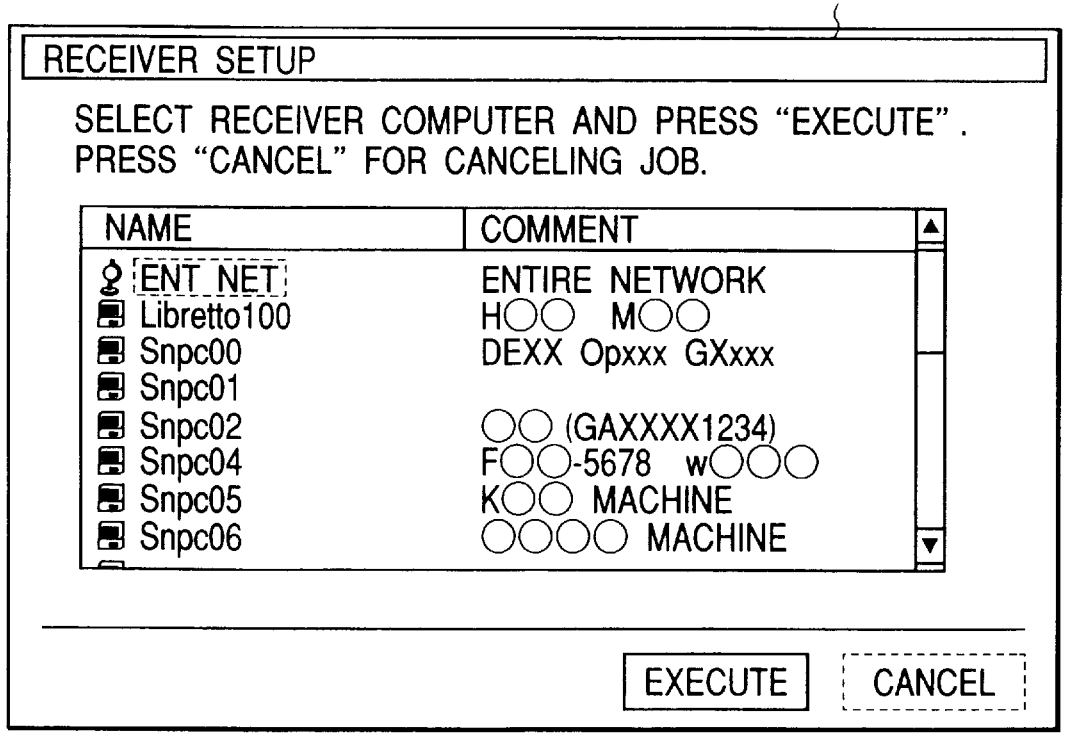
FIG. 21 is a diagram showing one example of the window displayed on the CRT of the data processing apparatus shown in FIG. 2.

FIGS. 20, 21 are diagrams showing examples of the window displayed on the CRT 16 of the data processing apparatus shown in FIG. 2. FIG. 20 shows a message window 20601 for confirming a setup change, and FIG. 21 shows a receiver list window 21701 for determining a receiver.

Figure 22:
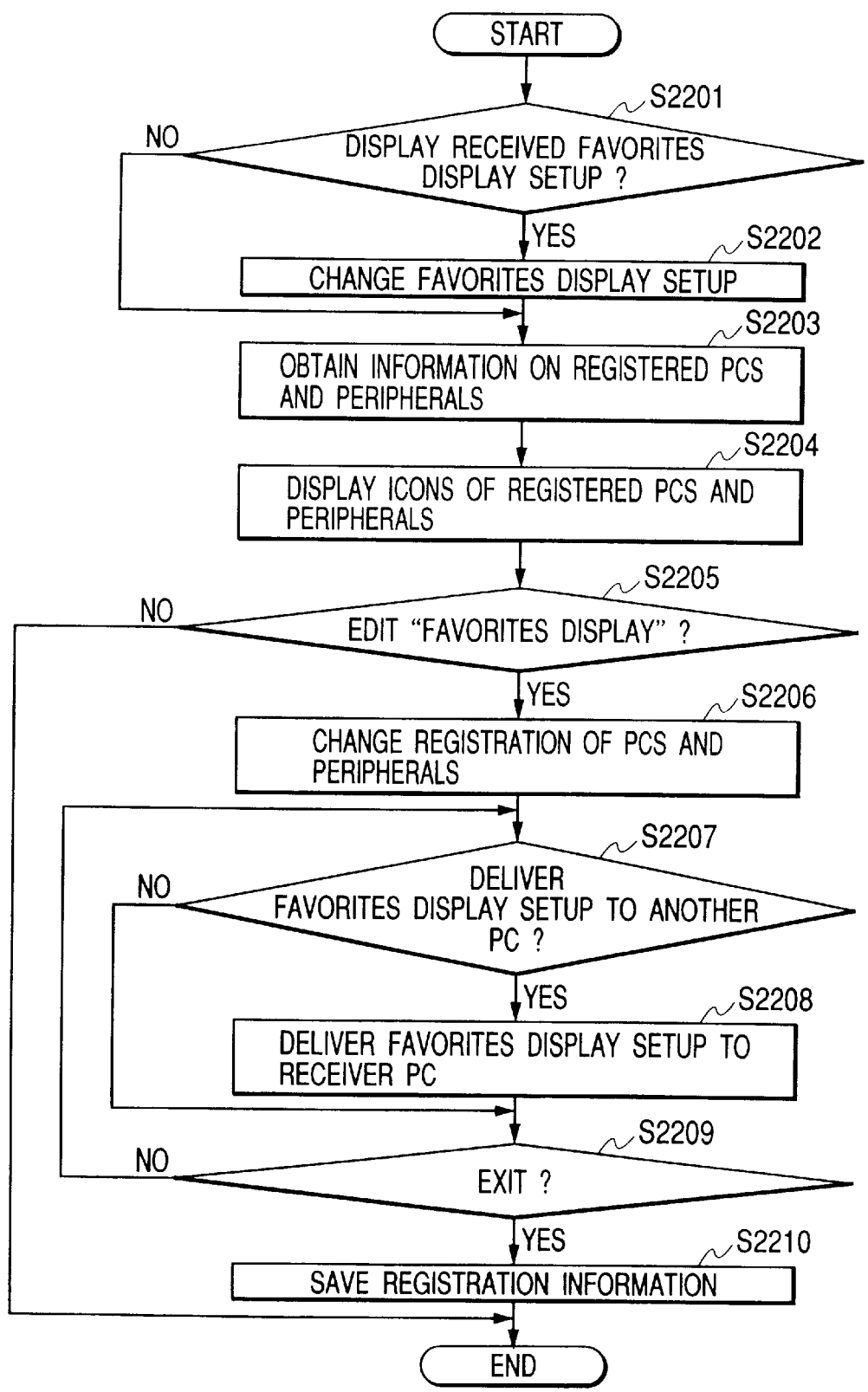
FIG. 22 is a flowchart showing one example of a third data processing procedure in the data processing apparatus of the present invention.

FIG. 22 is a flowchart showing one example of a third data processing in the data processing apparatus of the present invention. Additionally, S2201 to S2210 denote respective steps.

Moreover, in the present embodiment, the display includes two types, "normal display" to display all the PCs or peripherals on the network, and "favorites display" to display only the registered PCs or peripherals. The information data for displaying only the specified device among the PCs or peripherals on the network is referred to as "favorites display setup data".

First, it is judged in step S2201 whether the favorites display setup data is received when the application starts. The judging method comprises a method of checking a predetermined data area to judge whether the data is received, or a method of judging whether the received data is present in a predetermined directory or not.

Here, when it is judged that the favorites display setup data is received, for example, the window 20601 shown in FIG. 20 displays the message, waiting for the instruction as to whether to read the received setup data. When "YES", that is, the change is designated in the window 20601, the flow advances to step S2202. Here, when the setup is not changed to that of the received data, the previous favorites display setup is unchanged.

Subsequently, in step S2203, the connection information of the PCs or peripherals are obtained in accordance with the set favorites display setup data. Then, the obtained information are stored in the memories such as PMEM 3 shown in FIG. 2.

Furthermore, in step S2204, the information such as the operation situations of the respective devices are obtained, and the icons indicating the PCs and peripherals are displayed based on the information as shown in FIG. 18.

Subsequently, after the icons of the PCs and peripherals on the network are displayed, it is judged in step S2205 whether to edit the favorites display. To edit the favorites display, the item is selected from the menu, or the tool bar 451h shown in FIG. 18 is selected. Here, when it is judged that the favorites display edition is designated, the flow advances to step S2206.

In the step S2206, the data of the PCs and peripherals registered in the favorites display are read from the stored data of PMEM 3, and the data such as the connection state and operation situation of all the PCs and peripherals on the network are also read. Subsequently, by displaying the screen as shown in FIG. 17, the favorites display setup is placed in an editable state.

Subsequently, it is judged in step S2207 whether there is an instruction for delivering the favorites display setup data presently set in the edition screen to another PC on the network or not. The instruction method comprises selecting the item in the menu 4301 shown in FIG. 17, or operating the mouse 13 to select the icon 4301d. When the data is not delivered, the flow advances to step S2209. When the favorites display setup data is delivered, the flow advances to step S2208.

In the step S2208, the window for setting the PC to which the setup data is to be delivered, such as the window 21701 shown in FIG. 21, is displayed on the CRT 16 of PC. The user can deliver the favorites display setup data by selecting the receiver PC and designating the execution.

Here, when the receiver is designated and the favorites display setup data is received by the designated PC, the data indicating the reception is simultaneously written.

Subsequently, it is judged in step S2209 whether the exit instruction is given to the favorites display edition. The operation of finishing the favorites display edition comprises selecting the exit item from the menu 4301, or selecting the exit icon 4301a of the tool bar. When it is judged here that no exit instruction is given, the flow returns to the step S2207 to continue the edition processing. On the other hand, when it is judged in step S2209 that the exit instruction is given, the flow advances to step S2210. In the step S2210, the registration information of the edited favorites display is saved in the memory (hard disk 10, and the like), and the processing based on the application is finished.

In the above-described embodiment, it is judged whether the favorites display setup data is received at the start of the application, but another case can also be considered in which the user already executes the application and obtains the favorites display setup data set in another PC. Therefore, the constitution may comprise means for reading the favorites display setup data from another computer, and means for determining the sender. The embodiment will be described hereinafter.

FIG. 23 is a diagram showing one example of a sender setup window in the data processing apparatus of the present invention, and the window is displayed on each PC display, that is, the CRT 16 shown in FIG. 2. In FIG. 23, a sender setup window 23901 is displayed when it is instructed to obtain the favorites display setup data of another PC.

Figure 24:
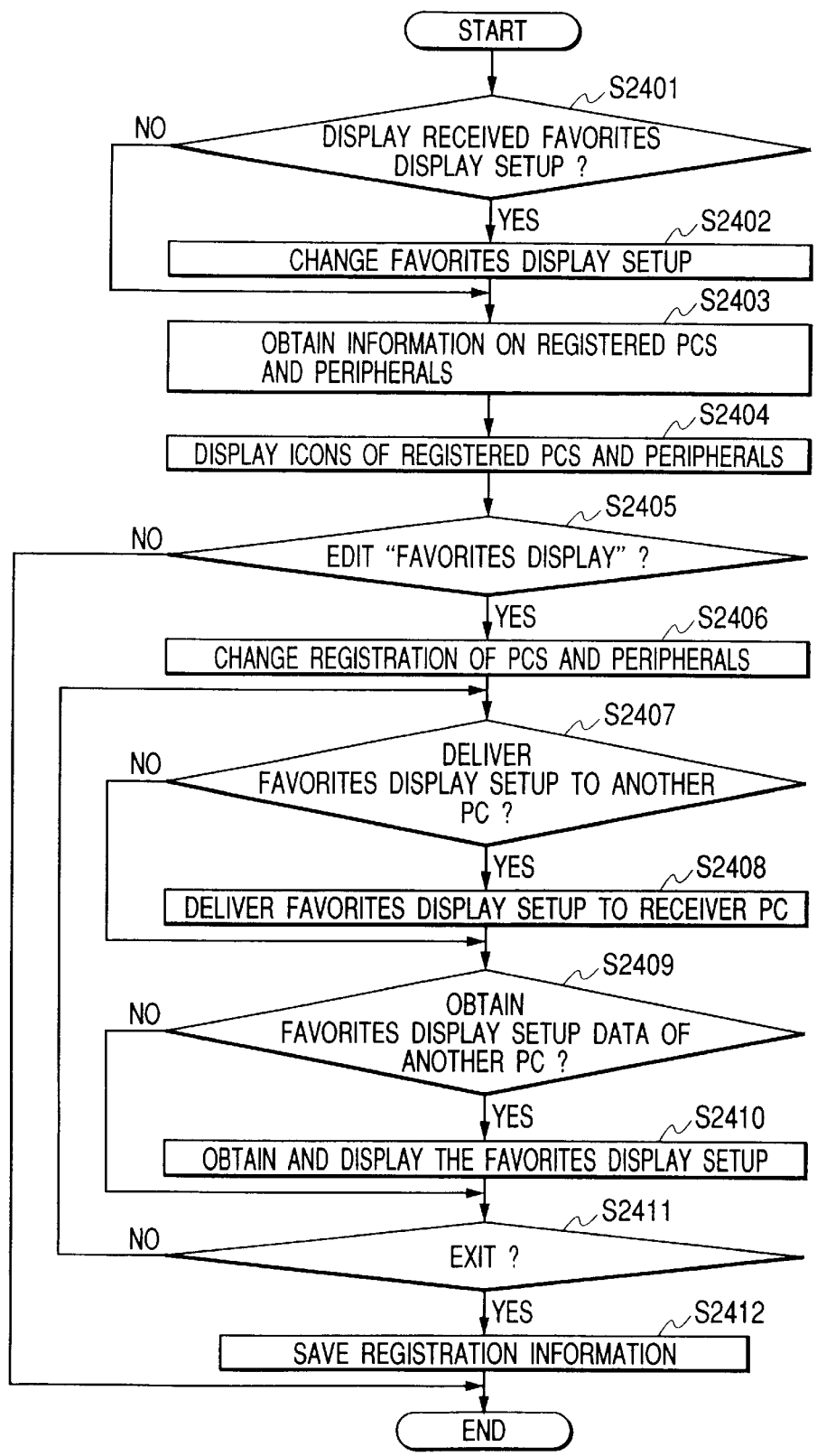
FIG. 24 is a flowchart showing one example of a fourth data processing procedure in the data processing apparatus of the present invention.

FIG. 24 is a flowchart showing one example of a fourth data processing procedure in the data processing apparatus of the present invention. Additionally, S2401 to S2412 denote respective steps. Moreover, in the present embodiment, the display method includes two types, "normal display" to display all the PCs or peripherals on the network, and "favorites display" to display only the registered PCs or peripherals, and the information data for displaying only the specified device among the PCs or peripherals on the network is referred to as "favorites display setup data".

First, it is judged in step S2401 whether the favorites display setup data is received when the application starts. The judging method comprises a method of checking a predetermined data area to judge whether the data is received or a method of judging whether the received data is present in a predetermined directory or not.

Here, when it is judged that the favorites display setup data is received, for example, the window 20601 shown in FIG. 20 displays the message, waiting for the instruction as to whether to read the received setup data. When "YES", that is, the change is designated in the window 20601, the flow advances to step S4202.

Here, when the favorites display setup is changed, and the setup is not changed to that of the received data, the previous favorites display setup is unchanged.

Subsequently, in step S2403, the connection information of the PCs or peripherals are obtained in accordance with the set favorites display setup. Then, the obtained information are stored in the memories such as PMEM 3 shown in FIG. 2.

Furthermore, in step S2404, the information such as the operation situations of the respective devices are obtained, and the easily recognizable forms such as the icons indicating the PCs and peripherals are displayed based on the information, for example, as shown in FIG. 18.

Subsequently, after the icons of the PCs and peripherals on the network are displayed, it is judged in step S2405 whether to edit the favorites display. To edit the favorites display, the item is selected from the menu, or the tool bar 451h shown in FIG. 18 is selected. Here, when it is judged that the favorites display edition is designated, the flow advances to step S2406. Here, the data of the PCs and peripherals registered in the favorites display are read from the stored data of PMEM 3, and the data such as the connection state and operation situation of all the PCs and peripherals on the network are also read and simultaneously displayed as shown in FIG. 17, so that the favorites display setup is placed in the editable state.

Subsequently, it is judged in step S2407 whether there is an instruction for delivering the favorites display setup data presently set in the edition screen to another PC on the network or not. The operation method comprises selecting the item in the menu 4301 shown in FIG. 17, or operating the mouse 13 to select the icon 4301d.

Here, when it is judged that no favorites edition is performed, the processing is finished. When it is judged that the favorites edition is performed, that is, when the favorites display setup data is delivered, the flow advances to step S2408.

In this case, the PC to which the setup data is to be delivered is designated. For example, the window 21701 shown in FIG. 21 is displayed on the CRT 16 of PC. The user can deliver the favorites display setup data by selecting the receiver PC and designating the execution.

Here, when the receiver is designated and the favorites display setup data is received by the designated PC, the data indicating the reception is simultaneously written.

Subsequently, it is judged in step S2409 whether it is instructed to obtain the favorites display setup data of another PC. The instructing operation method comprises selecting the item of the menu 4301 shown in FIG. 17, and the like. When it is instructed to obtain the data here, the flow advances to step S2410. Here, the window for selecting the PC from which the favorites display setup data is to be obtained, such as the sender setup window 23901 shown in FIG. 23, is displayed. The user can change the favorites display setup by selecting the sender PC and executing the processing.

Subsequently, it is judged in step S2411 whether the exit instruction is given to the favorites display edition. The operation of finishing the favorites display edition comprises selecting the exit item from the menu 4301, or selecting the exit icon 4301a of the tool bar.

When it is judged here that no exit instruction is given, the flow returns to the step S2407 to continue the edition processing.

On the other hand, when it is judged in the step S2411 that the exit instruction is given, the flow advances to step S2412, the registration information of the edited favorites display is saved in the memory (hard disk 10, and the like), and the processing based on the application is finished.

According to the above-described second to fourth data processings, by displaying only the PCs and peripherals registered by the user, receiving the setup data from another PC on the network, or designating another PC to obtain the data, and analyzing the data to correct the setup to the optimum setup suitable for the own machine constitution, the device shared on the network can easily be utilized in the same setup environment on any PC. This can prevent the wrong operations such as the wasteful setting operation and the use of the wrong device, and can enhance the operation efficiency.

The constitution of the data processing program readable by the data processing apparatus of the present invention will be described hereinafter with reference to a memory map shown in FIG. 25. FIG. 25 is an explanatory view of the memory map of the memory medium for storing various data processing programs readable by the data processing apparatus of the present invention.

Additionally, although not particularly shown, the information for managing programs to be stored in the memory medium, such as version information and user, are also stored, and the information dependent on OS, and the like on the program reading side, such as the icons for distinguishing/displaying the program, are also stored.

Furthermore, the data dependent on various programs are also managed by the above-described directory. Moreover, when the program for installing various programs in the computer, or the program to be installed is compressed, a thawing program, and the like may be stored.

The functions shown in FIGS. 9, 16, 22, 24 in the present embodiment may be fulfilled by a host computer in accordance with the program which is installed from the outside. In this case, the present invention is applied even when the group of information including the programs are fed to the output device from the storage media such as CD-ROM, flash memory and FD, or from the external storage media via the network.

As described above, it is needless to say that the object of the present invention is attained also by providing the system or the device with the memory medium with the program code of the software for realizing the above-described function of the embodiment recorded therein, and reading and executing the program code stored in the memory medium by the system of the device computer (or CPU or MPU).

In this case, the program code itself read from the memory medium realizes the inventive function of the present invention, and the memory medium with the program code stored therein constitutes the present invention.

Examples of the memory medium for supplying the program code include a floppy disk, hard disk, optical disk, magnetic optical disk, CD-ROM, CD-R, magnetic tape, nonvolatile memory card, ROM, EEPROM, and the like.

Moreover, needless to say, the above-described function of the embodiment is realized not only by executing the program code read by the computer, but also by performing a part or the whole of the actual processing based on the instruction of the program code by the operating system (OS) operating on the computer, and the like.

Furthermore, needless to say, the present invention also include a case in which the above-described function of the embodiment is realized by the processing comprising: writing the program code read from the memory medium to the memory mounted on a function extension board inserted to the computer or a function extension unit connected to the computer; and subsequently performing a part or the whole of the actual processing based on the instruction of the program code by the CPU, and the like mounted on the function extension board or the function extension unit.

What is claimed is:

1. A data processing apparatus which can communicate with a plurality of data processing apparatuses via a network, the data processing apparatus comprising:

first obtaining means for obtaining first information on the plurality of data processing apparatuses connected to the network;

first display means for displaying icons indicating the plurality of data processing apparatuses connected to the network on a display based on said first information;

selecting means for selecting a desired data processing apparatus from the plurality of data processing apparatuses;

second display means for displaying the icon indicating the data processing apparatus selected by said selecting means on the display;

display selecting means for selecting either of the display by said first display means and the display by said second display means; and switch control means for switching the display by said first display means and the display by said second display means in accordance with the selection by said display selecting means.

2. The data processing apparatus according to claim 1 wherein said second display means displays the icon indicating the data processing apparatus of an own machine so that the icon can be distinguished from the icons indicating the other data processing apparatuses.

3. The data processing apparatus according to claim 1 wherein said first information includes information indicating the position in which the icon is disposed.

4. The data processing apparatus according to claim 1 wherein said first information includes information indicating the type of the data processing apparatus.

5. The data processing apparatus according to claim 1 wherein said first information includes information indicating the status of the data processing apparatus.

6. The data processing apparatus according to claim 1 further comprising:

designating means for designating the icon displayed on said display; and executing means for allowing the data processing apparatus indicated by the icon designated by said designating means to execute a processing.

7. The data processing apparatus according to claim 1 wherein said data processing apparatus comprises a printer.

8. The data processing apparatus according to claim 1 wherein said data processing apparatus comprises a facsimile machine.

9. The data processing apparatus according to claim 1 wherein said data processing apparatus comprises a scanner.

10. The data processing apparatus according to claim 1 wherein said data processing apparatus comprises a digital copying machine.

11. The data processing apparatus according to claim 1 wherein said data processing apparatus comprises a personal computer.

12. The data processing apparatus according to claim 1 further comprising:

generating means for generating second information on the data processing apparatus selected by said selecting means; and transmitting means for transmitting said second information generated by said generating means to the other data processing apparatuses via the network.

13. The data processing apparatus according to claim 12 wherein said transmitting means comprises receiver selecting means for selecting the data processing apparatus to which said second information is transmitted.

14. The data processing apparatus according to claim 3 further comprising:

second obtaining means for obtaining third information on a predetermined data processing apparatus from another data processing apparatus via the network, among the plurality of data processing apparatuses connected to the network; and setting means for setting said second information to be the same as said third information obtained by said second obtaining means.

15. The data processing apparatus according to claim 14 wherein said second obtaining means comprises transmitter selecting means for selecting the data processing apparatus from which said third information is obtained.

16. The data processing apparatus according to claim 14 further comprising change means for changing said third information so that the icon indicating the data processing apparatus of the own machine can be distinguished from the icons indicating the other data processing apparatuses, said setting means setting said second information to be the same as said third information changed by said change means.

17. A data processing apparatus which can communicate with other data processing apparatuses via a network, the data processing apparatus comprising:

obtaining means for obtaining information of a plurality of data processing apparatuses connected to the network; and display control means for displaying icons indicating the plurality of data processing apparatuses connected to the network in a first area of a display, and displaying an icon indicating a data processing apparatus selected from the plurality of data processing apparatuses connected to the network in a second area different from said first area of said display, based on said information obtained by said obtaining means.

18. The data processing apparatus according to claim 17 wherein said display control means displays a window by dividing the window into a first window corresponding to said first area, and a second window corresponding to said second area.

19. The data processing apparatus according to claim 17 wherein in said second window, the icons indicating the other data processing apparatuses are arranged centering on and around the icon indicating the data processing apparatus which is an own machine.

20. A display processing method in a data processing apparatus which can communicate with a plurality of data processing apparatuses via a network, the display processing method comprising:

a first obtaining step of obtaining first information on the plurality of data processing apparatuses connected to the network;

a first display step of displaying icons indicating the plurality of data processing apparatuses connected to the network on a display based on said first information;

a selecting step of selecting a desired data processing apparatus from the plurality of data processing apparatuses;

a second display step of displaying the icon indicating the data processing apparatus selected by said selecting step on the display;

a display selecting step of selecting either of the display by said first display step and the display by said second display step; and a switch control step of switching the display by said first display step and the display by said second display step in accordance with the selection by said display selecting step.

21. The display processing method according to claim 20 wherein said second display step comprises displaying the icon indicating the data processing apparatus of an own machine so that the icon can be distinguished from the icons indicating the other data processing apparatuses.

22. The display processing method according to claim 20 wherein said first information includes information indicating the position in which the icon is disposed.

23. The display processing method according to claim 20 wherein said first information includes information indicating the type of the data processing apparatus.

24. The display processing method according to claim 20 wherein said first information includes information indicating the status of the data processing apparatus.

25. The display processing method according to claim 20 further comprising:
   a designating step of designating the icon displayed on said display; and
   an executing step of allowing the data processing apparatus indicated by the icon designated by said designating step to execute a processing.

26. The display processing method according to claim 20 wherein said data processing apparatus comprises a printer.

27. The display processing method according to claim 20 wherein said data processing apparatus comprises a facsimile machine.

28. The display processing method according to claim 20 wherein said data processing apparatus comprises a scanner.

29. The display processing method according to claim 20 wherein said data processing apparatus comprises a digital copying machine.

30. The display processing method according to claim 20 wherein said data processing apparatus comprises a personal computer.

31. The display processing method according to claim 20 further comprising:
   a generating step of generating second information on the data processing apparatus selected by said selecting step; and
   a transmitting step of transmitting said second information generated by said generating step to the other data processing apparatuses via the network.

32. The display processing method according to claim 31 wherein said transmitting step comprises a receiver selecting step of selecting the data processing apparatus to which said second information is transmitted.

33. The display processing method according to claim 22 further comprising:
   a second obtaining step of obtaining third information on a predetermined data processing apparatus from another data processing apparatus via the network, among the plurality of data processing apparatuses connected to the network; and
   a setting step of setting said second information to be the same as said third information obtained by said second obtaining step.

34. The display processing method according to claim 33 wherein said second obtaining step comprises a transmitter selecting step of selecting the data processing apparatus from which said third information is obtained.

35. The display processing method according to claim 33 further comprising a change step of changing said third information so that the icon indicating the data processing apparatus of the own machine can be distinguished from the icons indicating the other data processing apparatuses,
   said setting step comprising setting said second information to be the same as said third information changed by said change step.

36. A display processing method in a data processing apparatus which can communicate with other data processing apparatuses via a network, the display processing method comprising:
   an obtaining step of obtaining information of a plurality of data processing apparatuses connected to the network; and
   a display control step of displaying icons indicating the plurality of data processing apparatuses connected to the network in a first area of a display, and displaying an icon indicating a data processing apparatus selected from the plurality of data processing apparatuses connected to the network in a second area different from said first area of said display, based on said information obtained by said obtaining step.

37. The display processing method according to claim 36 wherein said display control step comprises displaying a window by dividing the window into a first window corresponding to said first area, and a second window corresponding to said second area.

38. The display processing method according to claim 36 wherein in said second window, the icons indicating the other data processing apparatuses are arranged centering on and around the icon indicating the data processing apparatus which is an own machine.

39. A computer-readable memory medium that stores a display processing program of a data processing apparatus which can communicate with a plurality of data processing apparatuses via a network, said display processing program comprising the steps of:
   a first obtaining step of obtaining first information on the plurality of data processing apparatuses connected to the network;
   a first display step of displaying icons indicating the plurality of data processing apparatuses connected to the network on a display based on said first information;
   a selecting step of selecting a desired data processing apparatus from the plurality of data processing apparatuses;
   a second display step of displaying the icon indicating the data processing apparatus selected by said selecting step on the display;
   a display selecting step of selecting either of the display by said first display step and the display by said second display step; and
   a switch control step of switching the display by said first display step and the display by said second display step in accordance with the selection by said display selecting step.

40. The memory medium according to claim 39 wherein said second display step comprises displaying the icon indicating the data processing apparatus of an own machine so that the icon can be distinguished from the icons indicating the other data processing apparatuses.

41. The memory medium according to claim 39 wherein said first information includes information indicating the position in which the icon is disposed.

42. The memory medium according to claim 39 wherein said first information includes information indicating the type of the data processing apparatus.

43. The memory medium according to claim 39 wherein said first information includes information indicating the status of the data processing apparatus.

44. The memory medium according to claim 39 wherein the display processing program further comprises:
   a designating step of designating the icon displayed on said display; and
   an executing step of allowing the data processing apparatus indicated by the icon designated by said designating step to execute a processing.

45. The memory medium according to claim 39 wherein said data processing apparatus comprises a printer.

46. The memory medium according to claim 39 wherein said data processing apparatus comprises a facsimile machine.

47. The memory medium according to claim 39 wherein said data processing apparatus comprises a scanner.

48. The memory medium according to claim 39 wherein said data processing apparatus comprises a digital copying machine.

49. The memory medium according to claim 39 wherein said data processing apparatus comprises a personal computer.

50. The memory medium according to claim 39 wherein said display processing program further comprises:
   a generating step of generating second information on the data processing apparatus selected by said selecting step; and
   a transmitting step of transmitting said second information generated by said generating step to the other data processing apparatuses via the network.

51. The memory medium according to claim 50 wherein in said display processing program, said transmitting step comprises a receiver selecting step of selecting the data processing apparatus to which said second information is transmitted.

52. The memory medium according to claim 41 wherein said display processing program further comprises:
   a second obtaining step of obtaining third information on a predetermined data processing apparatus from another data processing apparatus via the network, among the plurality of data processing apparatuses connected to the network; and
   a setting step of setting said second information to be the same as said third information obtained by said second obtaining step.

53. The memory medium according to claim 52 wherein in said display processing program, said second obtaining step comprises a transmitter selecting step of selecting the data processing apparatus from which said third information is obtained.

54. The memory medium according to claim 52 wherein said display processing program further comprises a change step of changing said third information so that the icon indicating the data processing apparatus of the own machine can be distinguished from the icons indicating the other data processing apparatuses, and
   said setting step comprises setting said second information to be the same as said third information changed by said change step.

55. A computer-readable memory medium that stores a display processing program of a data processing apparatus which can communicate with other data processing apparatuses via a network, the display processing program comprising the steps of:
   an obtaining step of obtaining information of a plurality of data processing apparatuses connected to the network; and
   a display control step of displaying icons indicating the plurality of data processing apparatuses connected to the network in a first area of a display, and displaying an icon indicating a data processing apparatus selected from the plurality of data processing apparatuses connected to the network in a second area different from said first area of said display, based on said information obtained by said obtaining step.

56. The memory medium according to claim 55 wherein said display control step comprises displaying a window by dividing the window into a first window corresponding to said first area, and a second window corresponding to said second area.

57. The memory medium according to claim 55 wherein in said second window, the icons indicating the other data processing apparatuses are arranged centering on and around the icon indicating the data processing apparatus which is an own machine.

58. A display processing program of a data processing apparatus which can communicate with a plurality of data processing apparatuses via a network, the display processing program comprising:
   a first obtaining step of obtaining first information on the plurality of data processing apparatuses connected to the network;
   a first display step of displaying icons indicating the plurality of data processing apparatuses connected to the network on a display based on said first information;
   a selecting step of selecting a desired data processing apparatus from the plurality of data processing apparatuses;
   a second display step of displaying the icon indicating the data processing apparatus selected by said selecting step on the display;
   a display selecting step of selecting either of the display by said first display step and the display by said second display step; and
   a switch control step of switching the display by said first display step and the display by said second display step in accordance with the selection by said display selecting step.

59. The display processing program according to claim 58 wherein said second display step comprises displaying the icon indicating the data processing apparatus of an own machine so that the icon can be distinguished from the icons indicating the other data processing apparatuses.

60. The display processing program according to claim 58 wherein said first information includes information indicating the position in which the icon is disposed.

61. The display processing program according to claim 58 wherein said first information includes information indicating the type of the data processing apparatus.

62. The display processing program according to claim 58 wherein said first information includes information indicating the status of the data processing apparatus.

63. The display processing program according to claim 58 further comprising:
   a designating step of designating the icon displayed on said display; and
   an executing step of allowing the data processing apparatus indicated by the icon designated by said designating step to execute a processing.

64. The display processing program according to claim 58 wherein said data processing apparatus comprises a printer.

65. The display processing program according to claim 58 wherein said data processing apparatus comprises a facsimile machine.

66. The display processing program according to claim 58 wherein said data processing apparatus comprises a scanner.

67. The display processing program according to claim 58 wherein said data processing apparatus comprises a digital copying machine.

68. The display processing program according to claim 58 wherein said data processing apparatus comprises a personal computer.

69. The display processing program according to claim 58 further comprising:
   a generating step of generating second information on the data processing apparatus selected by said selecting step; and a transmitting step of transmitting said second information generated by said generating step to the other data processing apparatuses via the network.

70. The display processing program according to claim 69 wherein said transmitting step comprises a receiver selecting step of selecting the data processing apparatus to which said second information is transmitted.

71. The display processing program according to claim 60 further comprising:

a second obtaining step of obtaining third information on a predetermined data processing apparatus from another data processing apparatus via the network, among the plurality of data processing apparatuses connected to the network; and a setting step of setting said second information to be the same as said third information obtained by said second obtaining step.

72. The display processing program according to claim 71 wherein said second obtaining step comprises a transmitter selecting step of selecting the data processing apparatus from which said third information is obtained.

73. The display processing program according to claim 71 further comprising a change step of changing said third information so that the icon indicating the data processing apparatus of the own machine can be distinguished from the icons indicating the other data processing apparatuses, said setting step comprising setting said second information to be the same as said third information changed by said change step.

74. A display processing program of a data processing apparatus which can communicate with other data processing apparatuses via a network, the display processing program comprising the steps of:

an obtaining step of obtaining information of a plurality of data processing apparatuses connected to the network; and a display control step of displaying icons indicating the plurality of data processing apparatuses connected to the network in a first area of a display, and displaying an icon indicating a data processing apparatus selected from the plurality of data processing apparatuses connected to the network in a second area different from said first area of said display, based on said information obtained by said obtaining step.

75. The display processing program according to claim 74 wherein said display control step comprises displaying a window by dividing the window into a first window corresponding to said first area, and a second window corresponding to said second area.

76. The display processing program according to claim 74 wherein in said second window, the icons indicating the other data processing apparatuses are arranged centering on and around the icon indicating the data processing apparatus which is an own machine.

* * * * *

UNITED STATES PATENT AND TRADEMARK OFFICE
CERTIFICATE OF CORRECTION

PATENT NO. : 6,714,974 B1
DATED : March 30, 2004
INVENTOR(S) : Machida

It is certified that error appears in the above-identified patent and that said Letters Patent is hereby corrected as shown below:

Column 1,
Lines 17 and 20, "have" (second occurrence) should read -- have been --;
Line 35, "states" should read -- status --; and
Line 37, "states." should read -- status. --.

Column 7,
Line 49, "flows" should read -- flow --.

Column 8,
Line 61, "favorite" should read -- favorites --.

Column 10,
Line 51, "these" should read -- this --.

Column 11,
Line 26, "It" should read -- In --.

Column 16,
Line 41, "include" should read -- includes --.

Signed and Sealed this

Sixteenth Day of November, 2004

JON W. DUDAS
*Director of the United States Patent and Trademark Office*